United States Patent
Gunner

(10) Patent No.: US 9,866,502 B2
(45) Date of Patent: Jan. 9, 2018

(54) PROGRAMMABLE BROADBAND GATEWAY HIERARCHICAL OUTPUT QUEUEING

(71) Applicant: CenturyLink Intellectual Property LLC, Denver, CO (US)

(72) Inventor: Christopher William Gunner, Harvard, MA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 240 days.

(21) Appl. No.: 14/824,001

(22) Filed: Aug. 11, 2015

(65) Prior Publication Data

US 2016/0044695 A1 Feb. 11, 2016

Related U.S. Application Data

(60) Provisional application No. 62/035,642, filed on Aug. 11, 2014.

(51) Int. Cl.
*H04L 12/861* (2013.01)
*H04L 12/931* (2013.01)
*H04L 12/935* (2013.01)

(52) U.S. Cl.
CPC ............ *H04L 49/90* (2013.01); *H04L 49/205* (2013.01); *H04L 49/3027* (2013.01)

(58) Field of Classification Search
None
See application file for complete search history.

(56) References Cited

U.S. PATENT DOCUMENTS

| | | | | |
|---|---|---|---|---|
| 7,116,680 B1* | 10/2006 | Kramer | ............... | H04L 12/5601 370/395.4 |
| 7,359,321 B1* | 4/2008 | Sindhu | .................... | H04L 47/10 370/230 |
| 7,653,069 B2* | 1/2010 | Lakshmanamurthy, Sr. | ........................... | H04L 47/60 370/388 |
| 8,681,609 B2* | 3/2014 | Szymanski | ............. | H04L 47/56 370/229 |
| 8,971,345 B1* | 3/2015 | McCanne | ........... | H04L 47/6215 370/412 |
| 2003/0174650 A1 | 9/2003 | Shankar et al. | | |

(Continued)

OTHER PUBLICATIONS

Bennett. Hierarchical Packet Fair Queuing Algorithms. Networking, IEEE/ACM Transactions on 5, No. 5, pp. 575-689, 1997.

(Continued)

*Primary Examiner* — Ayaz Sheikh
*Assistant Examiner* — Mariela Vidal Carpio
(74) *Attorney, Agent, or Firm* — Swanson & Bratschun, L.L.C.

(57) ABSTRACT

An improved method of hierarchical output queueing of packets for a network scheduler of a network gateway that determines delays needed to conform to applicable rate shaping, and enqueues the packets based on the delay. Queues are associated with different classes of service (CoS), and within each class, each queue has a different scheduled time upon which it becomes available for dequeuing. A single set of CoS queues can support a large number of devices, improving the efficiency of software-based queueing by reducing the number of queues and simplifying queue polling.

17 Claims, 18 Drawing Sheets

(56) References Cited

U.S. PATENT DOCUMENTS

| | | | | |
|---|---|---|---|---|
| 2004/0114583 A1* | 6/2004 | Cetin | ............... | H04L 45/50 |
| | | | | 370/360 |
| 2005/0281279 A1* | 12/2005 | Dennison | ............... | H04L 47/50 |
| | | | | 370/412 |
| 2010/0284274 A1* | 11/2010 | Ghanadan | ............... | H04L 47/10 |
| | | | | 370/230.1 |
| 2012/0224484 A1* | 9/2012 | Babiarz | ............... | H04L 41/5019 |
| | | | | 370/235 |
| 2014/0016463 A1* | 1/2014 | Kitada | ............... | H04L 47/20 |
| | | | | 370/230.1 |

OTHER PUBLICATIONS

Hogan. Hierarchical Fair Queuing. Technical Report 513. Basser Department of Computer Science, University of Sydney. Feb. 1997.
Intel. Data Plane Development Kit. Getting Started Guide. Jun. 2014.
Intel. Data Plane Development Kit. Overview: Packet Processing on Intel Architecture. Dec. 2012.
Stoica. CS 268: Packet Scheduling. Department of Computer Science, University of California Berkeley. Mar. 2004.

* cited by examiner

PROGRAMMABLE BROADBAND GATEWAY HIERARCHICAL OUTPUT QUEUEING

REFERENCE TO RELATED APPLICATION

This application claims priority to U.S. Provisional Patent Application 62/035,642 filed Aug. 11, 2014, an entirety of which is incorporated herein by reference.

FIELD

The application relates to a network gateway scheduling packets for transmission using multiple queues.

BACKGROUND

On a node in a packet switching communication network, a network scheduler, also called packet scheduler, is an arbiter that manages the sequence of network packets in the transmit and receive queues of the network interface controller (NIC). The network scheduler logic decides which network packet to forward next from the buffer. The buffer works as a queuing system, storing the network packets temporarily until they are transmitted. The buffer space may be divided into different queues, with each of them holding the packets of one flow according to configured packet classification rules. For example, packets can be divided into flows by their source and destination Internet Protocol (IP) addresses. Network scheduling algorithms and their associated settings determine how the network scheduler manages the buffer.

Network scheduling algorithms may provide specific reordering or dropping of network packets inside various transmit or receive buffers. Such reordering and dropping is commonly used as attempts to compensate for various networking conditions, like reducing the latency for certain classes of network packets, and are generally used as part of the quality of service (QoS) measures. For example, network scheduling algorithms may enable active queue management (AQM) and network traffic shaping. An AQM algorithm is used to select network packets inside the buffer when that buffer becomes full or gets close to becoming full, often with the larger goal of reducing network congestion. Traffic shaping is a technique which delays some or all packets to bring them into compliance with a desired traffic profile. Traffic shaping is used to optimize or guarantee performance, improve latency, and/or increase usable bandwidth for some kinds of packets by delaying other kinds. Traffic shaping provides a means to control the volume of traffic being sent into a network in a specified period (e.g., bandwidth throttling/shaping), or the maximum rate at which the traffic is sent (e.g., rate limiting/shaping), or based on other criteria.

A conventional hierarchical queueing model is illustrated in FIG. 22. In packet network applications such as a broadband network gateway or other broadband network edge platform, the queueing model may need to accommodate a large number of discrete queues on the output side of a packet forwarding path. In particular, each destination subscriber device, of which there may be tens of thousands on a single network port 2260, has rate shaper instances (2230a to 2230d), each of which has as input a small number (4 or 8 typically) of Class of Service (CoS) queues (2210a to 2210p). Class of service (CoS) is a parameter used in network data and voice protocols to differentiate the types of payloads contained in the packets being transmitted. The objective of such differentiation is generally associated with assigning priorities to each data payload.

Each set of per-device queues in FIG. 22 has a Weighted Fair Queue (WFQ) scheduler (2220a to 2220d) that pulls packets from the associated queues. Weighted fair queueing is a type of data packet scheduling scheme used by network schedulers to specify, for each device's packet flow, which fraction of the capacity will be given to each CoS queue 2210. Each WFQ scheduler 2220 is attached to a per-device Rate Shaper (2230a to 2230d). The set of per-device Rate Shapers (2230a to 2230d) provide downstream or upstream traffic shaping, and are then attached to one-or-more WFQ schedulers (e.g., 2240a, 2240b), which in turn is/are either attached directly to a physical output port 2260 or to a Virtual Port or Aggregate Rate Shaper (e.g., 2250a, 2250b). The Virtual Port or Aggregate Rate Shaper(s) 2250 provide downstream traffic shaping. Where Virtual Ports or Aggregate Rate Shapers 2250 are used, these are attached to the physical port 2260.

A standard implementation model has the input side processing queue packets onto the appropriate CoS queue 2210 for transmission to a destination device (e.g., Device 1, Device 2, etc.). Downstream rate shaping is not a consideration when selecting which CoS queue to enqueue a packet, as downstream rate shaping is handled by the output side of the model itself. The output side is illustrated in FIG. 22. Packets are picked from the device-specific CoS queues 2210 and forwarded, taking into account the rate shaper delay, weighted queueing and port/sub-port bit rates at all levels of the hierarchy. The output processing must find the next packet to transmit from all the per-device packet queues taking into account each of the Rate Shapers 2230/2250 and WFQ schedulers 2220/2240 in accordance with the hierarchy.

In a hardware implementation, it is possible to implement parallel algorithms that pick packets to send without inducing unnecessary delay (i.e., dead time on the network port 2260 due to inability to find a packet to transmit because of algorithm delay). However, in a software-based implementation, it is difficult to create an algorithm that will avoid dead time on the port 2260 because, in most central processing units (CPUs), there is little ability to perform a high degree of parallel processing. However, in a typical broadband gateway network scheduler software implementation of the hierarchical queuing model illustrated in FIG. 22, the network scheduler has to deal with tens of thousands of queues as well as tens of thousands of Rate Shaper and WFQ instances, creating efficiency and performance problems for a software implementation.

For example, a software implementation may have difficulty optimizing usage of the port 2260 because at any time, each of the tens of thousands of queues 2210 may or may not have any packets queued. Determining packet availability may require scanning this large number of queues, which requires excessive CPU processing as well as costly memory accesses even if queue occupancy is abstracted to a bit vector consisting of a single bit per queue. Even if multiple processor cores are used in parallel, the number of queues 2210 to be scheduled will typically far exceed the number of cores and still require a substantial amount of the processing power of each core.

As another example of a problem faced by a software implementation, the queue processing can waste CPU cycles when determining whether a destination device rate shaper is actually permitted to send a packet. That is, the network scheduler may try multiple device queues 2210 that are non-empty and still not find a packet that can be sent because a Rate Shaper's rate-limiting maximum rate requires delaying the next packet. To optimize the throughput of a software-based forwarding implementation it is desirable to optimize CPU cycles and, in particular, to avoid wasting CPU cycles in this way.

SUMMARY

According to an embodiment of the invention, provided is a method of scheduling packets for transmission over a network via a gateway device. A first plurality of queues is configured to each have a first scheduled time, where the first plurality of queues is associated with a first class of service (CoS), the first scheduled time of each of queue of the first plurality of queues is different, and packets stored in each respective queue of the first plurality of queues become available for dequeuing at the first scheduled time of the respective queue. A second plurality of queues is configured to each have a second scheduled time, where the second plurality of queues is associated with a second CoS, the second scheduled time of each of queue of the second plurality of queues is different, and packets stored in each respective queue of the second plurality of queues become available for dequeuing at the second scheduled time of the respective queue. After a first packet is received that is directed to a first device, a determination is made that the first packet is associated with the first CoS, and that the first packet is to be enqueued in the first plurality of queues based on the first CoS. A determination is also made to apply a first rate shaper and a second rate shaper of a plurality of rate shapers to the first packet. For each rate shaper, a future time for transmission of the first packet over the network is determined, with the later of the future times being selected to determine where to enqueue the first packet. A first queue of the first plurality of queues is selected into which to enqueue the first packet based on the first queue having a first scheduled time that is closest to the selected future time while being equal-to-or-sooner than the selected future time. The first packet is then enqueued into the first queue. Packets are dequeued from the first plurality of queues and from the second plurality of queues for transmission over the network. The first packet is dequeued from the first queue at or after the first schedule time of the first queue to be transmitted via the network to the first device.

According to another embodiment of the invention, provided is a computing device configured with executable instructions to configure the computing device to queue received packets for transmission via a network interface. A first plurality of queues are configured in a memory to each have a first scheduled time, where the first plurality of queues is associated with a first class of service (CoS), the first scheduled time of each of queue of the first plurality of queues is different, and packets to be stored in each respective queue of the first plurality of queues will become available for dequeuing in accordance with the first scheduled time of the respective queue. A second plurality of queues are configured in the memory to each have a second scheduled time, where the second plurality of queues is associated with a second CoS, the second scheduled time of each of queue of the second plurality of queues is different, and packets to be stored in each respective queue of the second plurality of queues will become available for dequeuing in accordance with the second scheduled time of the respective queue. In response to receiving a first packet directed to a first recipient device, the computing device is configured to determine that the first packet is associated with the first CoS, and determine that the first packet is to be enqueued in the first plurality of queues based on the first CoS. The computing device is also configured to select rate shapers to apply to the first packet from a plurality of rate shapers. For each selected rate shaper, a future time for transmission of the first packet over the network interface is determined, with the later of the future times being selected to determine where to enqueue the first packet. The computing device is configured to select a first queue of the first plurality of queues into which to enqueue the first packet based the first queue having a first scheduled time that is closest to the first future time while being equal-to-or-sooner than the selected future time. The computing device then enqueues the first packet into the first queue.

According to another embodiment of the invention, provided are instructions stored on a non-transitory computer-readable storage medium to configure a processor of a computing device to schedule received packets for transmission via a network interface. The instructions will configure the processor to configure a first plurality of queues in a memory to each have a first scheduled time, where the first plurality of queues is associated with a first class of service (CoS), the first scheduled time of each of queue of the first plurality of queues is different, and packets to be stored in each respective queue of the first plurality of queues will become available for dequeuing in accordance with the first scheduled time of the respective queue. The instructions will further configure the processor to configure a second plurality of queues in the memory to each have a second scheduled time, where the second plurality of queues is associated with a second CoS, the second scheduled time of each of queue of the second plurality of queues is different, and packets to be stored in each respective queue of the second plurality of queues will become available for dequeuing in accordance with the second scheduled time of the respective queue. The instructions will cause the processor to determine that a first packet is associated with the first CoS in response to receiving the first packet directed to a first recipient device, and to determine that the first packet is to be enqueued in the first plurality of queues based on the first CoS. The instructions will further cause the processor to select rate shapers to apply to the first packet from a plurality of rate shapers. For each selected rate shaper, the instructions will cause the processor to calculate a future time for transmission of the first packet over a network interface, with the later of the future times to be selected to determine where to enqueue the first packet. The instructions will further cause the processor to select a first queue of the first plurality of queues into which to enqueue the first packet based the first queue having a first scheduled time that is closest to the first future time while being equal-to-or-sooner than the selected future time. Thereafter, the instructions will further cause the processor to enqueue the first packet into the first queue.

BRIEF DESCRIPTION OF DRAWINGS

For a more complete understanding of the present disclosure, reference is now made to the following description taken in conjunction with the accompanying drawings.

DETAILED DESCRIPTION

Figure 1:
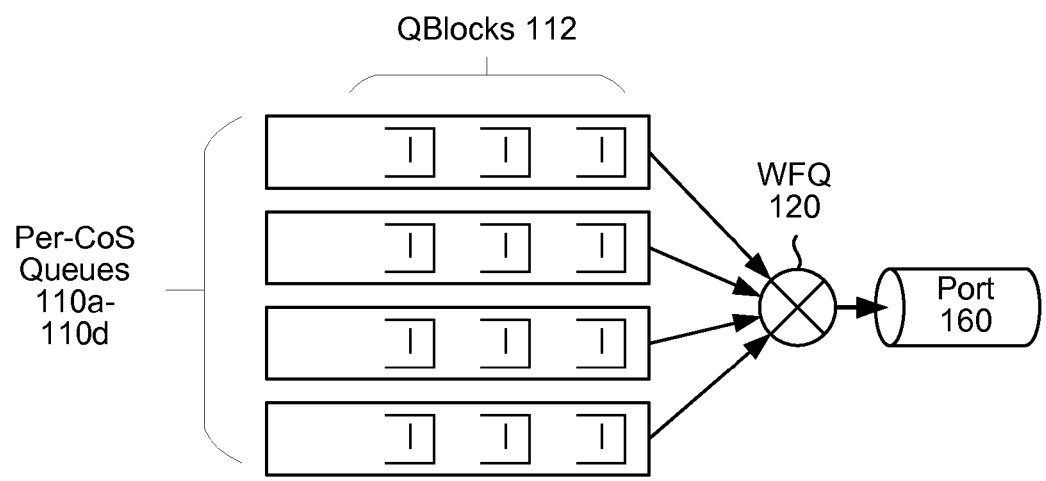
FIG. 1 illustrates an output stage of a network scheduler that uses an improved queueing model.

FIG. 1 illustrates an improved method of hierarchical output queueing for a network scheduler of a network gateway, such as a broadband network gateway. The improved output queueing method may be used with a rate shaping algorithm to schedule packets to meet a maximum allowed bit rate. The improve network scheduler may be efficiently executed in software, and is scalable to accommodate a large number of client devices. Unlike the conventional design, packets destined for all of the subscriber devices may be accommodated by a single set of CoS queues (e.g., 110a-d).

A set of per-CoS queues 110a to 110d queue packets for a plurality of subscriber devices. Each CoS queue 110 includes multiple QBlocks 112. Each QBlock within a CoS queue 110 is a first-in-first-out (FIFO) queue scheduled for availability to a Weighted Fair Queue (WFQ) scheduler 120 at a different time interval. When a QBlock 112 reaches the head of its respective CoS queue 110, the WFQ scheduler 120 transfers one-or-more packets from the QBlock 112 for transmission via a network port 160.

Figure 2:
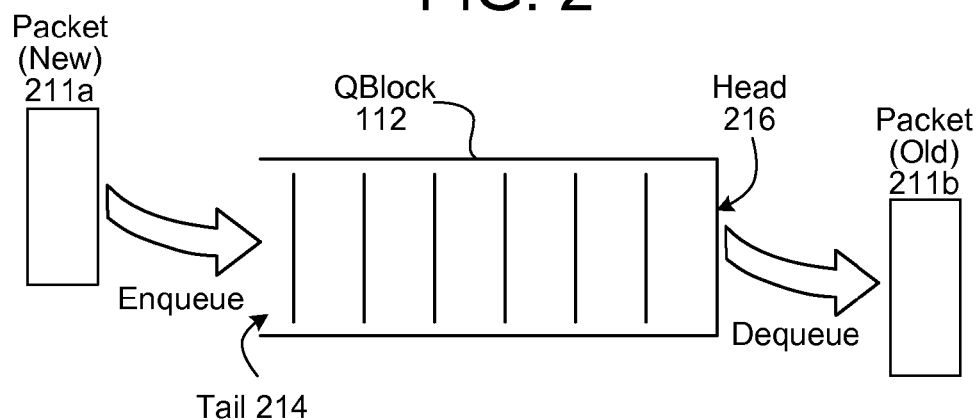
FIG. 2 illustrates a queue block (referred to herein as a "QBlock") utilized by the improved queueing model.

FIG. 2 illustrates an individual QBlock 112. A new packet 211a is enqueued to the tail 214 of the QBlock 112, whereas the packet 211b is dequeued by the WFQ scheduler 120 from the head 216 of the QBlock 112. Each QBlock structure 112 corresponds to a list of packets which are enqueued for a CoS and for transmission at a specific time.

A "head" attribute of a QBlock is a pointer to the packet at the head (216) of the queue. This is used for packet dequeue from the head 216 of the QBlock 112.

A "tail" attribute of a QBlock is a pointer to the packet at the tail 214 of the queue. This is used for packet enqueue to the tail 214 of the QBlock 112.

A "StartTime" attribute of a QBlock may correspond to a clock time with a suitable resolution (e.g., 1 millisecond) at which this QBlock should start being processed. This may be used for rate adaptation when the queue processing does not match the output rate. Clock time may be expressed and/or measured in "ticks" or cycles of a system clock used to control timing of operations of the processor. For example, if the system clock is 1 GHz, then 1 millisecond ("ms") would correspond to 1 million ticks of the system clock (i.e., $1/(1\times10^9$ pulses/sec$)\times10^6$ pulse=1 ms).

A "ByteCount" attribute of a QBlock is the count of bytes from all packets in the QBlock. This is updated in enqueue and dequeue.

Since the producer and consumer of the QBlock 112 may be different threads on different CPU cores and access is multi-producer, single consumer, this logical structure, if implemented using Intel's Data Plane Development Kit (DPDK) may use the Lockless Ring Buffer supported by the DPDK. In this case, the head and tail pointers are implemented with the Lockless Ring Buffer. Since the multi-producer enqueue operation requires read/write to the ByteCount, it is thread interlocked. This may be achieved using the Atomic Set operations in the CPU instruction set.

Figure 3:
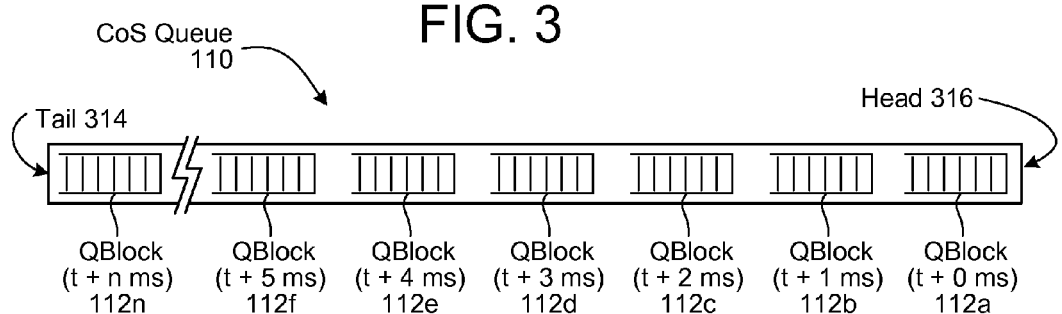
FIG. 3 illustrates a class-of-service (CoS) queue comprising a plurality of time-indexed QBlocks, as included in the improved queueing model.

As illustrated in FIG. 3, each CoS queue 110 includes multiple QBlocks (e.g., 112a to 112n), with each QBlock 112a-n assigned a different time interval which serves as a target "deadline" time to be dequeued by the WFQ scheduler 120. The QBlocks 112a-n form an ordered series with a forced delay between the availability each QBlock for dequeuing. The QBlock 112a at the head 316 of the CoS queue 110 is scheduled to be dequeued at current time "t," whereas the QBlock 112n at the tail 314 of the CoS queue 110 is scheduled to be dequeued at the current time plus "n" times the interval. An example of the interval between QBlocks 110a-n as illustrated is one millisecond.

Figure 4:
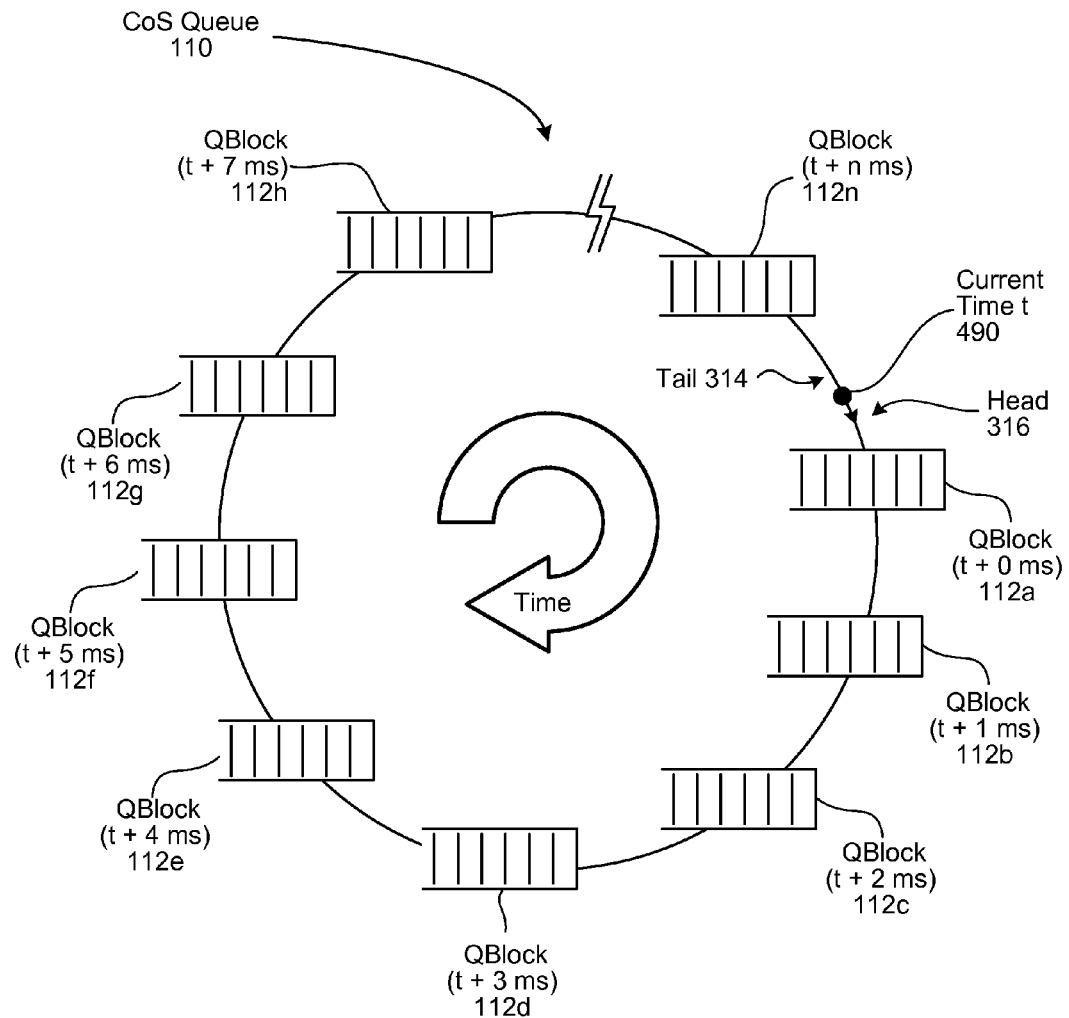
FIG. 4 illustrates how a QBlock may be recycled within a CoS queue over time.

As illustrated in FIG. 4, each CoS queue 110 may be a circular structure. After the WFQ scheduler 120 empties the QBlock 112a at the head 316 of the CoS queue 110 at the current time "t" 490, that QBlock is recycled to the tail 314 of the CoS queue 110, becoming the last QBlock 112n in the CoS queue 110. Although the QBlocks 112 advance up each CoS queue 110 with an enforced delay before becoming available to the WFQ scheduler 120, there is no specific delay for the dequeuing of packets from a QBlock 112 once it reaches the head 316 of the CoS queue 110 at time "t" 490.

The circular arrangement of QBlock recycling in FIG. 4 is advantageous because queue reuse minimizes the delays and memory management transactions associated with creating, ordering, and discarding queues. For example, the block of per-CoS queues 110a to 110d in FIG. 1 may be implemented as a three-dimensional array structure, where a first dimension distinguishes the class of service associated with the queue, the second dimension distinguishes QBlocks 112 within a CoS queue, and the third dimension delineates the available packet slots within the QBlock. As the intervals between the QBlocks within a CoS queue is a set value (e.g., 1 ms), a single memory address pointer may be used to designate which QBlock 112 is currently at the head of a CoS queue. Knowing which QBlock is at the head of the CoS queue 110 and the interval between QBlocks, the delay time for the other QBlocks may be readily determined based on its position in the reuse circle.

Each CoS queue structure corresponds to an instance of a CoS queue attached to a WFQ instance. There are multiple CoS queues 110 attached to each WFQ scheduler 120. Each CoS queue 110 contains a list of QBlock structures 112 (which may be implemented as an array within the CoS queue itself). That array logically forms the wrapped time-ordered list of QBlocks. The total span of time represented by the array of QBlocks is related to average Round Trip Time (RTT). This a configurable parameter which may be, for example, 128 ms. Each QBlock 112 represents an interval of transmit time, such as 1 ms of transmit time, when full to its normal ByteLimit. For example, there may be 128 QBlocks 112 by per CoS queue 110. At any time, one Qblock 112a will be the active head (316) for packet removal for output (called the CurrentActiveQBlock). But any QBlock within the active time range may be chosen for packet enqueue during input processing of a packet. Note that a QBlock may have higher than its ByteLimit packet data enqueued (i.e. it may be overcommitted).

A "ByteLimit" attribute may be used to indicate the number of bytes which a QBlock 112 attached to this CoS queue 110 represents when it is full. This is derived from TimeQuantum*MaxDrainRate. Note packets can be enqueued to a QBlock in excess of the ByteLimit—in fact up to the size of the QBlock ring buffer itself which is a separately configurable parameter.

A "TimeQuantum" attribute may be used to indicate the time it would take to transmit ByteLimit bytes at a line rate on the output port 160.

A "MaxDrainRate Rate" attribute in bytes per second may be used to indicate the line rate of the output port 160. For a physical output port this is the nominal line rate of the port, such as 1 Gbps (in bytes) or 10 Gbps (in bytes).

A "QueueDepthTime" attributes may be used to provide the time in milliseconds that corresponds to the maximum queue depth. The number of QBlocks 112 in the QBlockArray is derived from (QueueDepthTime*MaxDrainRate)/ByteLimit. A default value for QueueDepthTime may be, for example, 128 ms, and is a configurable parameter A "QueueDepthBytes" attribute is a derived parameter computed from QueueDepthTime*MaxDrainRate.

A "CurrentActiveQBlock" attribute may be used to provide an index (ordinal number) of the QBlock in the QBlockArray that is the currently active head.

A "CurrentTimeQBlock" attribute may be used to provide an index (ordinal number) of the QBlock in the QBlockArray whose time range overlaps current time. Because of congestion, the CurrentTimeQBlock may be later in future time sequence than the CurrentActiveQBlock.

A "DropHighThreshold" attribute may be used to provide a time delta above which to start dropping QBlocks for rate adaptation.

A "DropLowThreshold" attribute may be used to provide a time delta total below which to stop dropping QBlocks for rate adaptation.

A "QBlockArrayCount" attribute may be used to provide a count of QBlocks in the QBlockArray. This value may be fixed/defined at initialization time.

A "Weight" attribute may be used to provide a configured weight for a respective CoS queue 110. Negative values are used to mean absolute priority for the CoS queue. Positive values are used to mean Weight for this CoS queue.

Various Weighted Random Early Detection (WRED) parameters may be provided for each CoS queue 110. This set of WRED parameters (configuration and dynamic state) for WRED computation include an exponential weighted moving average (EWMA) state. WRED configuration parameters may include: "ExponentialWeightFactor" (float) for EWMA compute, "MinimumThreshold" or "MinT" (byte count) at which to start applying WRED (non-zero drop probability threshold), "MaximumThreshold" or "MaxT" (byte count) for random probability upper limit (threshold at which drop probability is set to MaximumDropProbability), "MaximumDropProbability" or "Max Prob" (float) which is the drop probability when the current EWMA (byte count) is greater-than-or-equal to MaximumThreshold.

WRED dynamic state parameters may include "CurrentEWMA" or "EWMA" (byte count) computed incrementally from one or more previous EWMA values. This represents the queue depth value to use. WRED dynamic state parameters may also include "CurrentMaxDropProbability" or "Drop Probability" (float in range 0 . . . 1) computed periodically by the output process and used by the input process to determine whether to drop a packet by computing a random number in the range 0 . . . 1 and dropping a packet if that random value is less than the value of the CurrentMaxDropProbability.

A "QBlockArray" attribute may be used to provide an array of QBlock structures. This may be treated as a wrapped (cyclic) list, as illustrated in FIG. 4. The CurrentActiveQBlock is the index in the QBlockArray of the QBlock which is being actively processed (polled for packets to output).

Of these attributes, the following are read/write by multiple threads: CurrentActiveQBlock (multi-producer-read, single-consumer-read/write), CurrentTimeQBlock (multi-producer-read, single-consumer-read/write), and WRED dynamic state CurrentMaxDropProbability (multi-producer-read, single-consumer-read/write).

Those attributes that have only a single writer do not require interlock but do create potential cache coherency inefficiency. That is not bad if the write rate is relatively low as for CurrentActiveQBlock, CurrentTimeQBlock and is achieved for WRED dynamic state by updating producer-read state values at a lower periodicity than per-packet.

An advantage of the improved packet queueing model provided through the use of the QBlocks is that many bandwidth and traffic rate conditions associated with the shaping and throttling of packets destined for a particular destination device may be accommodated in the improved scheduler by enqueuing a packet into a QBlock 112 which has an enforced delay time that will produce a target transmission rate. Examples of target transmission rates include rates relative to an overall rate for the gateway, a target rate for a network path over which the packet will travel to the subscriber device, and rates associated with the subscriber device. Rates associated with a specific subscriber device include those based on hardware limitations of the device and upstream and downstream rate limits associated with a subscriber device's service subscription. As will be explained further below in the context of how packets are enqueued into QBlocks 112, the enforced delay of each QBlock may be used to produce the overall delay needed to produce a target rate for each destination device, without the need to separately queue packets for each device. An aggregate rate shaper can be used, for example, to represent a downstream congestion point of known limited bandwidth. It can also be used to rate shape any arbitrary subset of traffic.

In the input processing method, the input processing algorithm may include computation of the aggregate rate shaper as well as any other rate shaper which applies to the packet as described earlier. Since the input algorithm as described can already compute multiple rate shapers that apply to the same packet and from those use the maximum computed delay to enqueue a packet to the output QBlock, this method does not require any additional functionality beyond that provided by the enforced delay time of the QBlock. This method can also be used for an input aggregate rate shaper where it is required to additionally rate shape an arbitrary aggregate of received traffic.

In the output processing method, the output processing algorithm may include computation of the aggregate rate shaper. This case may be preferred when the aggregate is used to represent a downstream bandwidth restriction and where that restriction point is a network element (a bridge/switch, router, etc.) which has limited packet buffering capability. In that case, to avoid possible buffer overruns on the downstream restriction point device, the algorithm needs to be optimized to make the jitter on the actual transmission rate as low as possible. The input processing method is not optimized to reduce jitter—instead it is optimized for CPU throughput.

Figure 5:
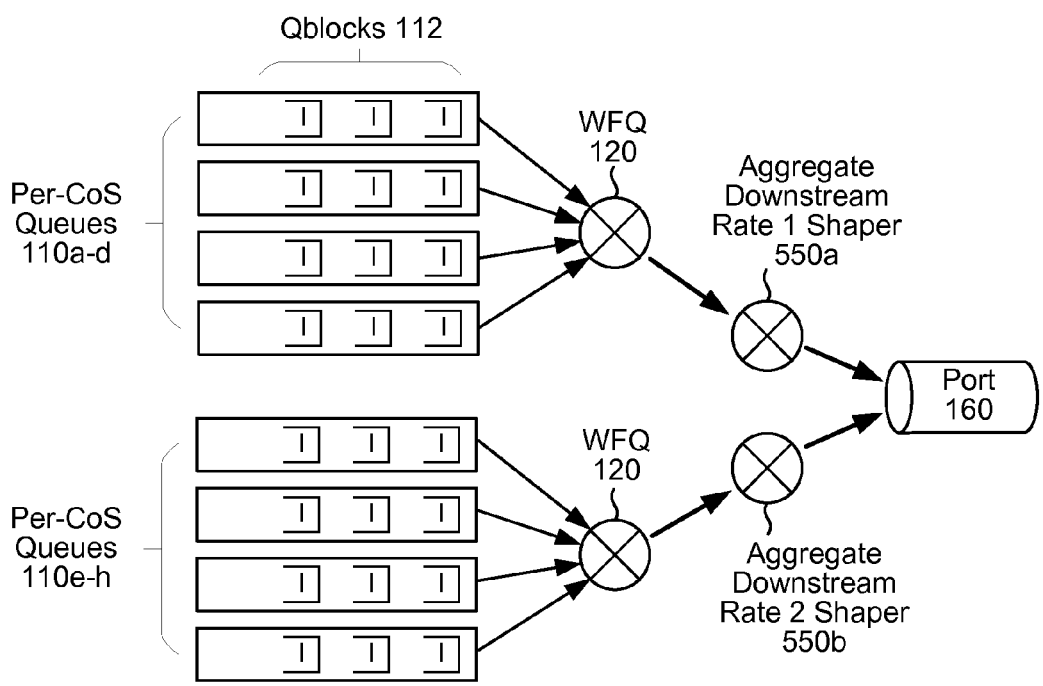
FIG. 5 illustrates the output stage of the improved queueing model with the addition of aggregate downstream rate shaping.

FIG. 5 illustrates the output stage that may be used with the improved queueing model to provide an output using aggregate rate shaper 550. In this method, each such aggregate rate shaper 550 may be created as a "Virtual Port" within the output side processing. Each has its own separate set of CoS queues with the same QBlock structure as a physical port, as described earlier, and attached to a WFQ instance 120 which is attached to the aggregate rate shaper 550. Packets are enqueued to the appropriate QBlocks for a Virtual Port by the input processor in the same way as described for a physical port.

The output processing has the additional functionality of polling Virtual Ports (as well as Physical Ports if necessary). Unlike the polling method for physical ports which simply attempts to transmit as fast as possible by queueing packets to the output port transmission ring buffer, for a Virtual Port the method is enhanced to police the MaxRate configured for the aggregate rate shaper 550. In this case because the number of aggregate rate shapers 550 is constrained to be a small number (e.g., less than 64), it is feasible to simply poll the aggregate rate shapers 550 and test whether each is allowed to send based on its token bucket state. If it is allowed to send then the output processing invokes the same WFQ scheduling method described for a physical port. Otherwise it is skipped and tested again on the next polling cycle.

To control the jitter on the transmitted MaxRate, the depth of packet burst allowed for processing can be configured to allow a trade-off between processing efficiency and jitter. In FIG. 5, a first group of CoS queues 110a-d are associated with a first rate shaper 550a, whereas a second group of CoS queues 110e-h are associated with a second rate shaper 550b. The different rate shapers 550 may shape packet rates to accommodate different downstream packet rates after a packet is transmitted over a network via the port 160. Examples of such downstream conditions include bandwidth restrictions based on conditions of a network that the packet must traverse (e.g., remote constriction points between the gateway and the designation device, such as a subscriber device), and the need to shape the output traffic to control jitter to accommodate a downstream destination device's buffer capacity (e.g., the buffer capacity of a subscriber device), where the jitter is an expression of the variation in the packet rate to that destination.

However, whereas most downstream bandwidth and traffic rate conditions associated with the shaping and throttling of packets destined for a particular destination device may be accommodated by the improved scheduler when a packet is enqueued into a QBlock 112, jitter is controlled by the aggregate rate shapers 550. While the improved queuing model may be used to limit the maximum rate of packets to a destination device, a dedicated rate shaper 550 may provide more robust jitter control, reducing timing variation between packets. For example, the per-CoS queues 110a-d may be associated with various downstream devices that have large input buffers, making them more tolerant of jitter, whereas the per-CoS queues 110e-h may be associated with downstream devices having small input buffers, making them susceptible to overflow and packet loss if too many packets are received together.

The output processing is optimized by having a small number of queues 110 to inspect for packets to transmit such that it is feasible to poll those queues. To optimize further, the method may process a burst of packets from a queue on each poll cycle (e.g., the polling WFQ scheduler 140 will consume multiple packets (if present) from the same queue once it has been chosen for processing).

The CurrentActiveQBlock for a CoS queue 110 may not have any packets present, in which case that CoS queue is logically empty for current packet processing. This is true even if subsequent QBlocks are non-empty. Only as time advances and a subsequent non-empty QBlock becomes the CurrentActiveQBlock does the CoS queue become logically non-empty for current packet processing. Since processing the CurrentActiveQBlock may lag behind the CurrentTimeQBlock because of congestion, it is always allowed to send from QBlocks that precede the CurrentTimeQblock as well as that QBlock itself. In other words, after congestion where CurrentActiveQBlock precedes CurrentTimeQblock, packets can be pulled from the intervening QBlocks as fast as allowed, and without further congestion the CurrentActiveQBlock will "catch up" to the CurrentTimeQblock. Note that enqueue of packets is always to, or after, the CurrentTimeQblock since this preserves the token bucket rate shaping result. In the absence of congestion from other CoS queues sharing the output port, the flow does not end up with CurrentActiveQBlock lagging significantly behind CurrentTimeQblock. But such congestion can occur causing the actual drain rate of the Qblocks for a CoS queue to fall indefinitely behind. The algorithm may include a QBlock drop process which is invoked when the lag becomes severe.

Attempting to poll from an empty QBlock is computationally inexpensive. The ByteCount is not used to track the actual remaining bytes in the QBlock. ByteCount is only increased as packets are enqueued. Decrementing the ByteCount as packets are dequeued is avoided for efficiency (and some of the algorithms, such as QBlock full handling, depend on this to avoid potential packet reordering). This does mean that the WRED computation will overstate the depth of the set of QBlocks for a CoS queue, but the EWMA smooths that out sufficiently to be unimportant.

While a port is uncongested, the queues will have few packets present, and the QBlock processing will keep up with actual time. If a port is congested then QBlock processing falls behind actual time. If this delay exceeds a maximum (high watermark) threshold then the output processing performs a QBlock dropping algorithm in which all the packets in the active QBlock are dropped and the QBlock index is advanced. This is iterated until the delay falls below the minimum (low watermark) threshold, and has the benefit of being a fast drop algorithm so that severe congestion can be recovered quickly. Note that the intent of WRED is to avoid getting into severe congestion except rarely. Note also that an implementation choice is to make no adjustment to the rate shaper(s) that were applied to a dropped packet to account for the fact that the packet was never actually sent. This is not a significant issue because the scenario is severe congestion such that committed Maximum Rates are not generally being achieved anyway.

Figure 6:
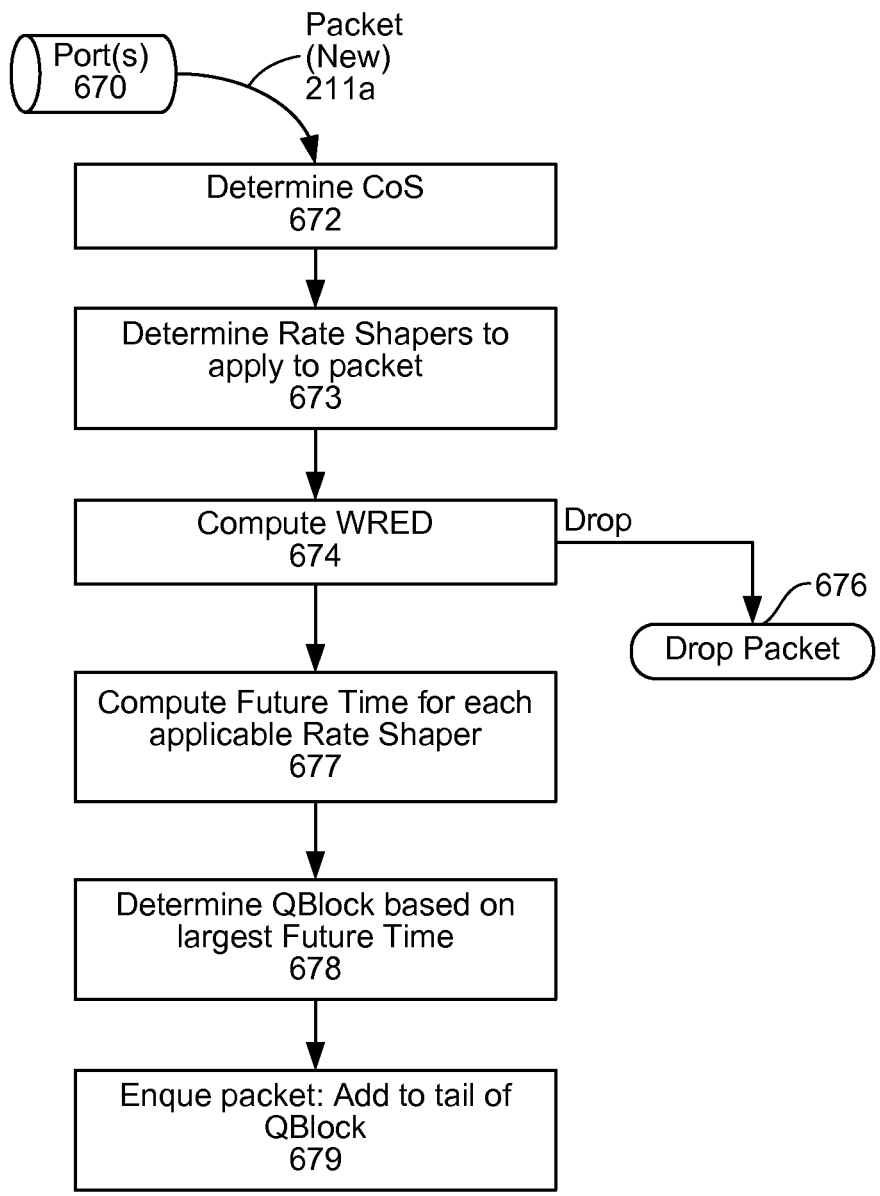
FIG. 6 illustrates an example of a process flow for a packet in an input stage that may be utilized by the improved queuing model to enqueue the packet into a QBlock.

FIG. 6 illustrates an example of a process flow for a packet in an input stage that may be utilized by the improved queuing model to enqueue the packet into a QBlock. Packets are received by the input stage via one or more input ports 670. As a high level overview of the process flow, the input stage determines a class of service for each packet (672), determines which rate shapers to apply to the packet (673), computes Weighted Random Early Detection (WRED) (674) for each packet and drops (676) some packets, computes a "future time" (677) for each rate shaper applicable for packets that were not dropped by WRED, determines which QBlock 112 for the determined CoS the packet should be enqueued into (678) based on the largest computed future time, and enqueues the packet, adding it to the tail 214 of the selected QBlock 112. Each of these process steps will be described in detail below. Other steps may be added, such as a step to determine an output port (e.g., 160) for the packet 211a when there is more than one upstream port, prior to computing WRED (673) since the packet drop probability used to compute WRED may vary for the same CoS based in part on the output port.

The input processing for a packet first determines the packet's Class of Service (CoS). A variety of different techniques may be used to determine (672) the class of service. Examples include determining the CoS based on: examining the Differentiated Services Code Point (Internet Protocol packet header information), determining a priority value from an Ethernet header of the packet in accordance with the IEEE 802.1p standard, determining an IEEE 802.1Q tag of the packet for virtual local area network (VLAN) priority as may be used for Ethernet traffic separation, and applying packet matching rules to check a packet's header information against one-or-more access control lists (ACLs). More than one technique may be used to determine the class of service, and the techniques may be given a priority order to determine which technique should be applied to determine which CoS a packet 211a should be assigned.

The rate shapers that should be applied to a packet may be determined (673) based on various criteria, such as an upstream rate limit imposed by the source provider of the packet (e.g., for a packet originating with from an upstream client/customer device, where the upstream client/customer is contractually limited to a per-client/customer upstream limit rate, such as 50 Mb/second), a downstream rate limit imposed on the destination device (e.g., where the destination device is rate-limited pursuant to a per-customer downstream limit), and aggregate rate shaping through the output port 160, such as downstream network bandwidth restrictions. Among other methods, look up tables may be used to determine which rate shapers to apply.

Tables related to downstream network bandwidth restrictions may be maintained (among other ways) by utilizing an active resource controller to compile and monitor statistics relating to network traffic conditions, such as by monitoring the time it takes to receive a reply from a destination device and measuring downstream packet loss to the destination device. Such statistics may be computed, among other ways, based on a per-destination device basis, or aggregated based on destination Internet Protocol addresses.

Weighted random early detection (WRED) is a queueing discipline for a network scheduler suited for congestion avoidance. The WRED algorithm uses the CoS queue state (read-only). If this causes the packet to be dropped, then any further processing is avoided. As used with the improved queueing method, WRED may be computed (674) prior to enqueuing a packet into a QBlock 112 based on a drop probability associated with the CoS queue 110 containing the QBlock. The drop probability represents a likelihood that a packet added to a QBlock 112 within the CoS queue 110 will be dropped prior to transmission via the output port 160.

The input stage computes the future time (677) for each rate shaper to be applied to the packet. Each rate shaper may be structured as an extended variation on a "token-bucket," with the bucket determining how much delay to impose on the packet before it may be dequeued from a QBlock 216. The bucket strategy imposes a delay in an enqueued packet, which the individual bucket imposes so as not to exceed the rate of the rate shaper. Each token bucket has a "depth." A negative depth indicates that more packets have been sent than allowed, resulting in the rate shaper imposing a delay to conform to the bucket rate. The "future time" delay of a packet corresponds to the depth of the bucket in bytes divided by the maximum rate in bytes-per-second.

Based on the largest future time computed by the applicable rate shapers for a packet and the determined CoS, a determination (678) is made as to which QBlock 112 to enqueue the packet. The process selects the QBlock in the applicable CoS queue 110 that has a soonest schedule time prior to the future time. In other words, the selected QBlock will have a scheduled time (as discussed above in connection with FIGS. 3 and 4) closest to the determined future time, that is less than or equal to that future time. This will impose the needed delay on the packet to achieve the packet rate upon which the future time was based. The packet is then enqueued into the selected QBlock 112, adding the packet to the tail 214 of the QBlock.

The combined input method (FIG. 6) and output method (FIG. 1, FIG. 5) may be implemented within the context of a network gateway fastpath forwarding implementation and represent a significant part of that fastpath forwarding implementation. "Fastpath" connections have an interleaving depth of 1, which is to say that one packet is transmitted from the output port 160 at a time. As illustrated, the method of the fastpath implementation uses a split processing model in which packet forwarding consists of an input processing method (FIG. 6) and an output processing method (FIG. 1, FIG. 5).

The input processing method may be implemented by a single CPU core to process packets received from one or more input ports (e.g., port(s) 670), such as 10 Gb Ethernet ports. The result of processing a packet in this method is to enqueue the packet to a queue which is then processed by the output processing method. The output processing method may also use a single CPU core to process packets for output to one or more output ports (e.g., port 160), such as 10 Gb Ethernet ports. Both input and output processing methods may use a run-to-completion implementation in which the method polls its input(s) for packets to process and processes each packet to completion, with the input process enqueuing each packet to the appropriate output queue.

Figure 22:
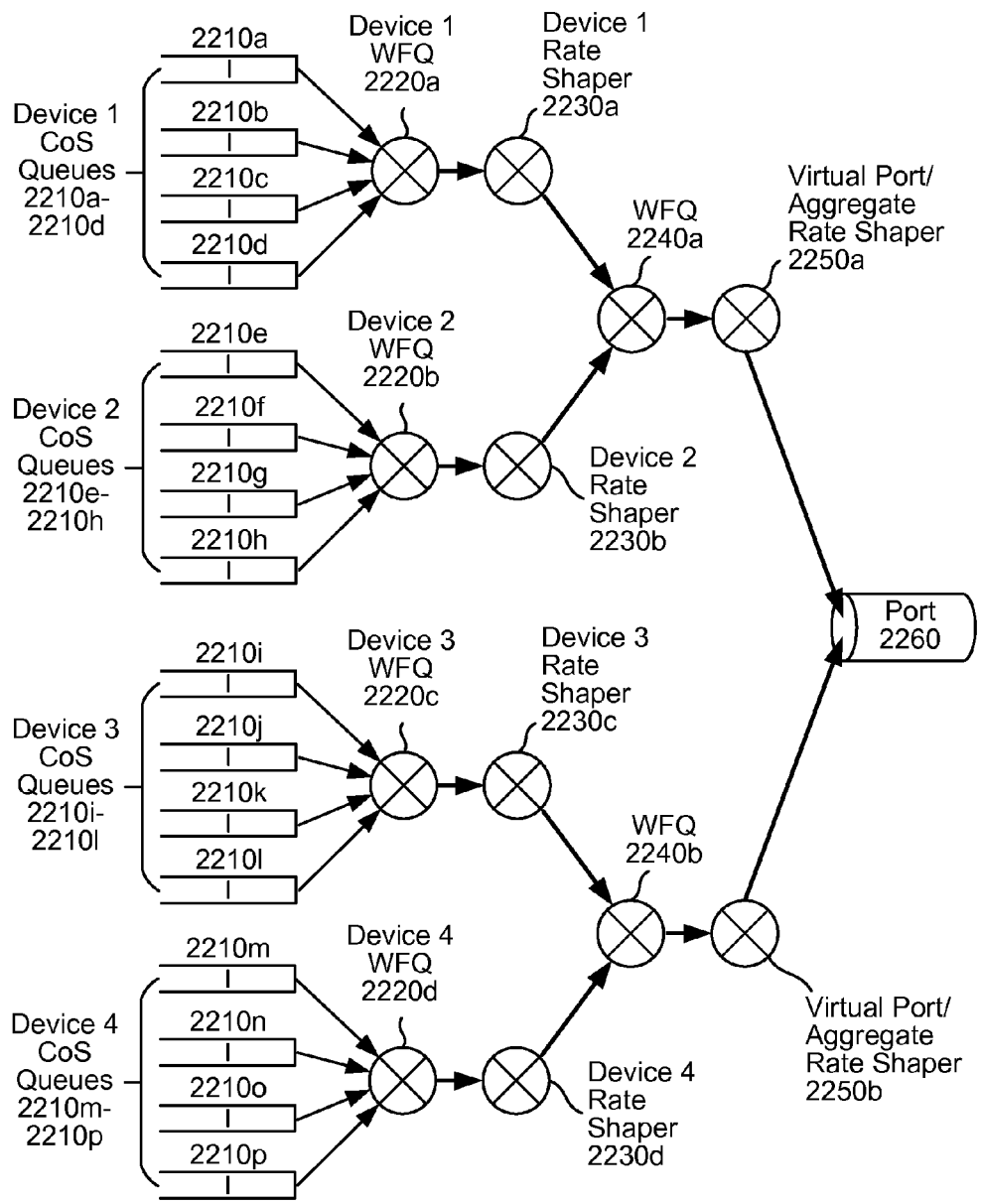
FIG. 22 illustrates a conventional hierarchical queueing model.

For Quality of Service (QoS), the processing model uses a computed future transmit schedule time and places packets in a future queue for a CoS associated with an output port 160. The complete method is called Future Time Hybrid Scheduling (FTHS). This is different to a normal hierarchical queue implementation (such as that in FIG. 22) in which packets are simply enqueued to a per-CoS, per-device queue attached to an output rate shaper in turn attached to a WFQ scheduler. In the FTHS method, there are no per-device queues on the output side: there are only per-CoS queues which are shared by multiple devices. This reduces the number of queues to a small enough number that software can use a polling method to find packets for transmission without a significant loss of throughput due to polling empty queues.

The essence of FTHS is to determine during processing a packet at what future time it should be allowed to be transmitted. This result is generated from all input and output rate shapers that may apply (steps 673 and 677 in FIG. 6). The packet is then enqueued (step 679) to a future queue for that time on the output port 160. If there is no congestion on the output port then the packet will be sent on time at its future time (possibly resulting in dead time on the port).

Further to FIG. 6, the input fast path processing may include polling the input port 670 receive (Rx) ring buffers for packets to process using a simple round robin poll method. A multi-tuple packet header hash lookup may be used to get a forwarding table entry for the Internet Protocol (IP) flow for the packet. That forwarding table entry may be used to maintain packet and byte counters for the IP flow and to determine actions to be taken to process the packet including: forwarding result (output port, output device flow instance and Class of Service (CoS)); input device meter (optional); input rate shaper (optional) (using input device flow instance rate shaper); output rate shaper (optional) (using output device flow instance rate shaper); and any additional rate shapers to be applied to the packet.

Input fast path processing may also include the WRED result (674) from the CoS queue congestion state and saved WRED state. This may result in packet drop (676) performed by input processing. The drop decision is made as early as possible to avoid unnecessary further processing and to avoid, where possible, rate shaping counting packets that are subsequently dropped. It is not simple to do that when the congestion drop is performed at the output—at least not with sufficient efficiency although it is possible to credit back a rate shaper when a packet is dropped at the expense of more CPU cycles and memory contention (cache coherency overhead between threads).

If applicable, an input rate shaper result "InputFutureTransmitTime" may only apply if the input device has a shaper instance. If the InputFutureTransmitTime is greater than a Maximum Queue Depth Time then the packet may be dropped without further processing. Similarly, if applicable, an output rate shaper result "OutputFutureTransmitTime" may only apply if the output device has a shaper instance. If the OutputFutureTransmitTime is greater than a CoS queue Queue Depth Time, then the packet may be dropped without further processing (it would not be possible anyway to correctly enqueue this packet onto a CoS queue 110)

A maximum future time (FutureTime) from InputFutureTransmitTime and OutputFutureTransmitTime is used to determine FutureTime, which is used with a CoS queue instance to determine (678) the CoS QBlock, with the packet then enqueued (679) to the tail of the CoS QBlock. If additional rate shapers apply, then by extension, the maximum future time is simply computed as the maximum value from all per-rate shaper future times. As needed, the input fast path processing may also include packet header rewriting.

Further to FIGS. 1 and 5, the output processing may include polling ports (e.g., 160) for transmit opportunity and polling CoS queues 110 for packets to transmit. For a single CPU core, there may be a WFQ scheduler instance 120 per port 160. There may be a configurable number of CoS queues 110 per WFQ scheduler 120. The method may use weighting parameters as well as absolute priority configuration setting to determine the processing order of the CoS queues. Since the wasted cycles consumed by polling empty queues is proportional to the number of queues, configuration can limit the number of CoS to only the minimum number of CoS queues needed. Where 8×1 GbE modules drive up the CoS queue count, there are more cycles available because the aggregate line rate is lower than 1×10 GbE. This is likely sufficient to balance the increased number of CoS queues to poll. An additional helping factor is that when the aggregate traffic rate is high then on average more queues are non-empty and so there are less wasted cycles.

Output processing packet dequeue is chosen from CoS queue head. FTHS may use a "burst" dequeue model. For example, dequeueing up to 16 packets from the chosen queue for transmit. This improves both memory and CPU cycle efficiency. Packet transmit may enqueue the packet burst to the output port's transmit (Tx) ring buffer.

The output processing method may perform rate adaptation. If the port 160 is congested such that a CoS queue falls behind current time by a configurable threshold amount of time, output processing may then drop entire CoS QBlock packet sets until under that threshold. Note that WRED is intended to make this a less frequent condition, but it can still occur and when it does, dropping packets from the head 216 of the QBlock 112 is effective. This has the benefit of being a fast drop algorithm so that congestion recovery is fast. As an alternative, if tail dropping is preferred, then the method can be extended to drop QBlocks in tail-first order.

Output processing may periodically update the WRED state. For example, periodically (e.g. every 10 ms), the output processing may compute a new WRED state for a CoS queue 110. This state may be read-only by input processing and only updated periodically to avoid causing unnecessary memory overhead (cache coherency latency) between threads.

The combined input and output processing implementation is optimized for CPU and memory efficiency at the expense of inaccurate QoS over burst intervals. As long as the QoS (maximum rate) for a device is achieved over a time span of the order 10 ms, then smaller time spans where the rate varies are judged to not matter. The period of inaccuracy can be tuned by configuring the packet burst dequeue count as well as periodicity parameters within the method that determine how often WRED and rate shaper states are recomputed. That configuration represents a trade-off between QoS accuracy over small intervals (QoS jitter) and throughput per-CPU (since less QoS jitter implies more CPU cycles spent doing recomputation and so less CPU cycles available for forwarding packets).

Some computations that would normally be performed for every packet may instead be performed on an aggregate of packet bytes. For example, the computation of a rate shaper FutureTime result may be done on every n bytes (for example 10 k bytes) boundary instead of on every packet, which effectively allows for an n byte burst at line rate. Note that this is independent of a configured burst size property (i.e., token bucket depth) of a rate shaper which may be a much larger value of the order of Mbytes.

When the CPU(s) used to implement the input processing (FIG. 7) support hyper-threading in which multiple CPU hyper-thread contexts (LCores) exist for each physical CPU execution engine (PCore), then the processing method may advantageously use 1 LCore for each PCore. This avoids the issue where use of multiple LCores per PCore, in which each LCore executes a polling method, causes wasted CPU cycles because the work load of each LCore is not the same. For example, where each LCore is polling its subset of port receive ring buffers for packets to process, there is usually a difference in the packet receive rate on each port. This leads to the less loaded LCore wasting CPU execution cycles polling empty ring buffers at the expense of the other LCores sharing the same PCore, which could have used those cycles to perform packet processing.

An alternative method is to allocate 1 of the LCores as "master" and for it to be the only LCore that polls the receive port (670) ring buffers. That Lcore then queues some of the packets to be processed to the other "slave" LCores by queuing them to a ring buffer that each other LCore will read and by scheduling those LCores to start executing their method. Once a slave LCore has finished processing its set of packets, it may be configured to inspect its ring buffer for further work, processing those packets if any exist or putting itself into halted state if not. This method reduces the wasted CPU cycle issue to an insignificant amount (the potential waste for a single poll of an empty ring buffer before halting). This method also helps amortize a memory latency issue (discussed further below) because when an LCore's current instruction is waiting for memory access, the PCore can switch to executing one of its other LCores, and so potentially perform useful work if any of those LCores is not also waiting for memory access.

While modern CPUs have high aggregate bandwidth memory subsystems, the latency for access to the memory can have a significant effect on performance. A modern CPU usually has multiple levels of memory cache in the CPU chip itself—typically three levels of cache with different characteristics of cache size and latency for access. This cache provides significant benefit in avoiding memory access latency. Modern CPUs also implement cache preload strategies such as predictive memory pre-fetch into the cache based on recent memory access patterns.

However, these methods may not be capable of helping sufficiently when the memory access pattern is very scattered (i.e. not predictive based on simple memory access pattern). In a packet forwarding application, the memory accesses are typically highly scattered as the number of instances of data structures increases. This is because the order of packets received tends to be from many active IP flows for many devices and processing each packet requires accessing data structures specific to it that are not ordered in memory in correlation with the packet receive order. For example, if there are tens of thousands of devices active with associated per-device rate shapers, then the memory accesses to read/write the rate shapers, forwarding table, etc., are scattered because the packet arrivals for IP flows are also scattered.

To improve the throughput by removing memory access latency, the FTHS may use memory prefetch as part of its method. This prefetch may be done using CPU instructions that perform a prefetch of a specified memory location (e.g., an explicit pipelining pre-fetch). The method may use prefetch of each significant data structure instance (such as a Rate Shaper) as part of processing of a burst of packets received from a receive port's ring buffer.

Another important performance factor is cache-coherency between CPUs. If CPU 1 writes memory (updating its cache), and CPU 2 needs to read that memory then there is an enforced cache synchronization which can increase the latency for the reader. To minimize this, the method may minimize the amount of shared memory between input processing threads and output processing threads. For example, the WRED method (674) may be optimized to only a single variable (i.e., CurrentMaxDropProbability) for each CoS queue 110 that is shared between threads.

The method supports any number of rate shapers being applied to the same packet. Processing (677) each rate shaper results in a FutureTime value which is the earliest time at which the packet can be transmitted so that the rate shaper's maximum rate is not exceeded. Each applicable rate shaper returns its FutureTime and the method uses the maximum from all such FutureTimes as the FutureTime to use for computing the QBlock (678) for enqueue of the packet (679). An example of a scenario where multiple rate shapers may exist for a packet is when a packet is received from subscriber device A (with A's input Rate Shaper applied) and sent to a second subscriber device B (with B's output Rate Shaper applied). Another example is when a packet is sent to subscriber device A (with A's output Rate Shaper applied) and also sent through an aggregate Rate Shaper R (with R's output Rate Shaper applied). Since the method can support an arbitrary number of Rate Shaper applications to the same packet then other scenarios are possible.

Figure 7:
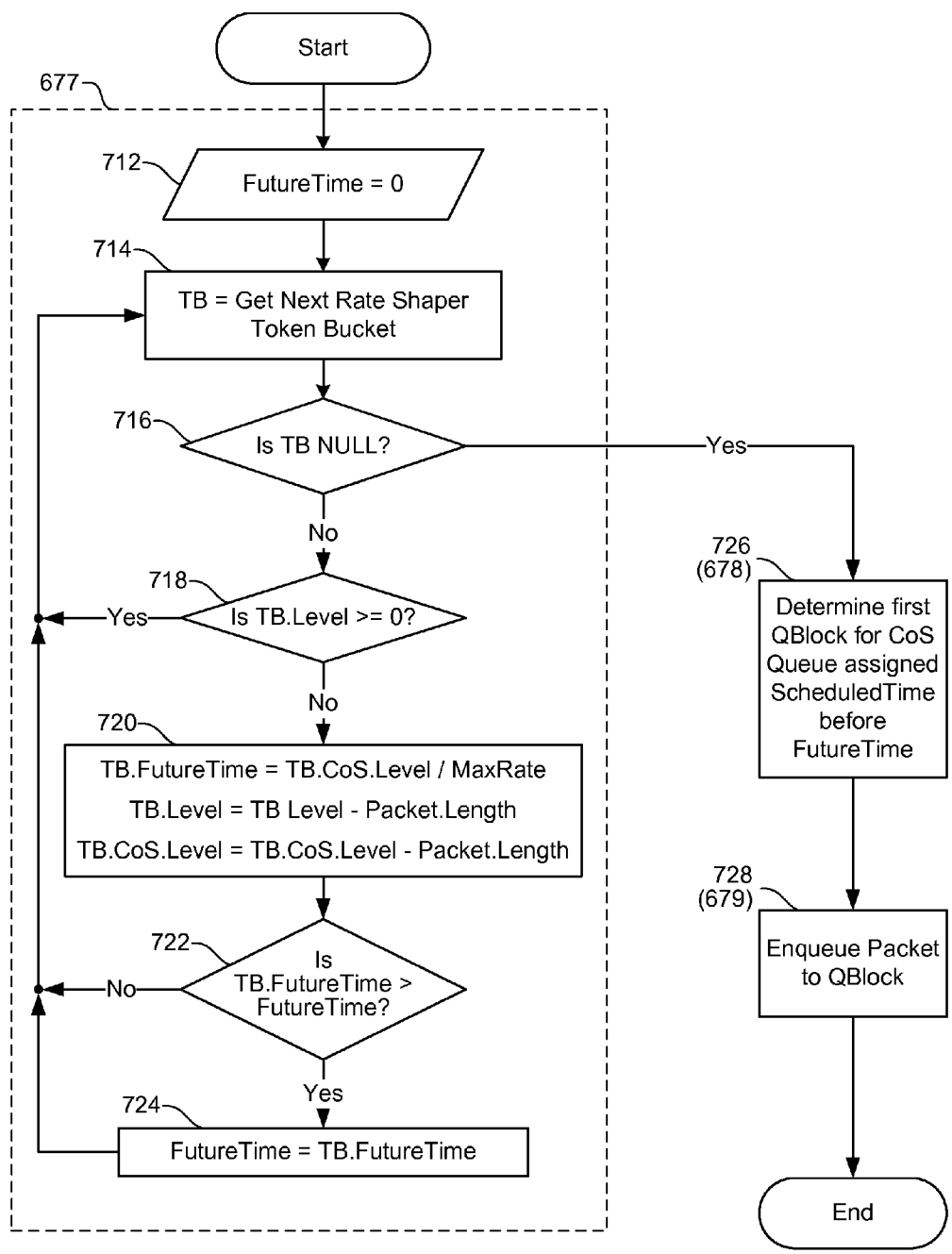
FIG. 7 illustrates an example of a process that may be used in the process flow in FIG. 6 to enqueue a packet into a QBlock.

FIG. 7 illustrates an example of a process that may be used to perform stages 677, 678, and 679 of the process flow in FIG. 6 to enqueue a packet into a QBlock 112. The process in FIG. 7 may be performed on a per-packet flow basis, with each rate shaper modeled as an extended variation on a token bucket. A variable "FutureTime," will hold the largest future time associated with an applicable rate shaper when the routine in FIG. 7 is complete. The variable FutureTime may be initialized to zero (712).

The input processing performs rate shaping (all applicable rate shapers). This results in a future time (delta from current time) at which the packet is allowed to be transmitted. The rate shaper computation requires that the CoS for the packet is known so that per-CoS token bucket state can be used. The current rate shaper to be used is designated by the variable "TB" (i.e., token bucket). The variable TB is set (714) to the next rate shaper token bucket applicable to the packet, as determined in step 673 in FIG. 6. A determination 716 is made as to whether TB is Null (716), which would indicate that all of the rate shapers applicable to the packet have been applied. If there is another rate shaper (716 "No"), a determination (718) is made as to whether the level of the token bucket is greater than or equal to zero. The value of the variable "TB.Level" corresponds to the rate shaper's maximum "burst" depth. Burst depth is the size in bytes that the rate shaper is allowed to send at when it has accumulated credits (in token bucket terms, this is the "depth" of the bucket). If the level of the token bucket is greater than or equal to zero (718 "Yes"), than that rate shaper is discarded for the current packet and the next token bucket is selected for analysis (returning to 714).

Otherwise, if TB.Level is not greater than or equal to zero (7 "No"), a variable representing the rate shaper's future time "TB.FutureTime" is set to equal the target CoS queue's current level ("TB.CoS.Level") in terms of bytes divided by the MaxRate, where "MaxRate" is the rate in bytes per second that the shaper will send traffic when there are no accumulated credits. In token bucket terms, the MaxRate is the bucket fill rate. The variable TB.Level is decremented to be equal to its prior value minus the length of the packet ("Packet.Length"). Also, TB.CoS.Level is decremented to be equal to its prior value minus the packet length.

The current rate shaper's TB.FutureTime is then compared (722) with the largest future time determined so far. If the rate shaper's future time is larger than the largest found so far (722 "Yes"), then the largest future time ("FutureTime") is set equal to the rate shaper's future time. After adjusting the FutureTime (724) or not (722 "No"), the process loops back to calculate the future time for a next rate shaper (714). When there are no more rate shapers to apply (716 "Yes"), a QBlock 112 into which the packet will be enqueued is determined (726, corresponding to 678 in FIG. 6), determining the QBlock 112 in the CoS queue 110 that has a soonest scheduled dequeuing time before the future time. The packet is then enqueued (728, corresponding to 679 in FIG. 6) to that QBlock.

The CoS queue state CurrentTimeQBlock and future time (as a time delta to current time) together with the TimeQuantum and wrapped BlockArray may be determined for the QBlock to which to enqueue the packet (add to tail). Note that the sequence of QBlocks do not necessarily accumulate packets in order because enqueue to them is based on future time schedule. The QBlock is allowed to be overcommitted in the sense that more packets are queued to it than its nominal transmit time. This is done to mitigate inter-device starvation by preventing a small number of high traffic rate sources starving other sources of opportunity to transmit through the same CoS queue. However, the overcommit is limited by the size of the buffer that is used for the QBlock which is configurable. In the event that the input enqueue operation finds that the selected QBlock is full then it iterates over subsequent QBlocks to find the first non-full QBlock and adds the packet to that QBlock queue.

This algorithm results in predictable processing time (CPU cycles plus memory accesses) to perform enqueue regardless of numbers of queues and congestion state (except for the QBlock full condition explained above).

Figure 8:
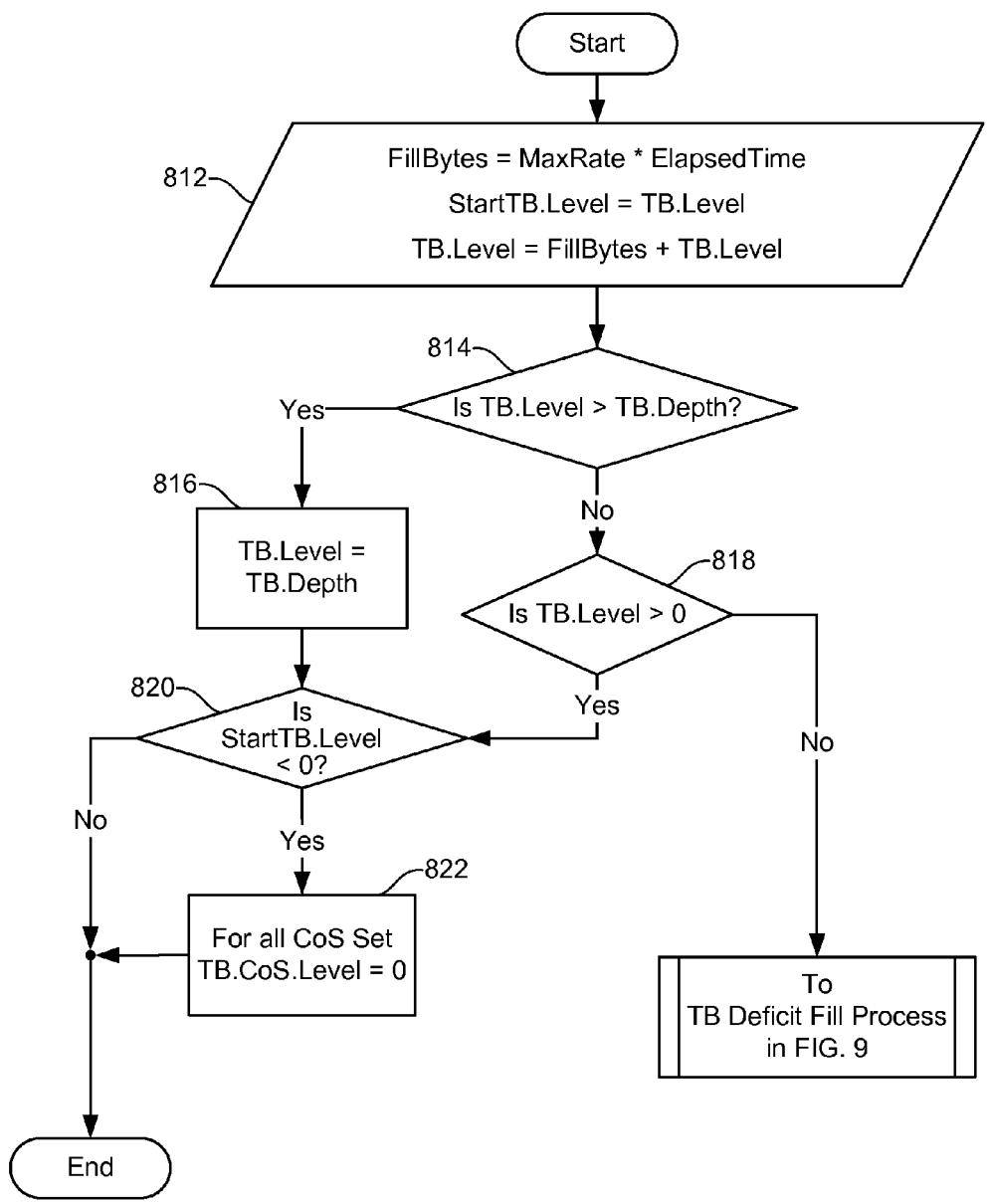
FIGS. 8, 9, and 10 illustrate an example of a process that may be used by a rate shaper to maintain the rate shaper's maximum fill rate.
Figure 9:
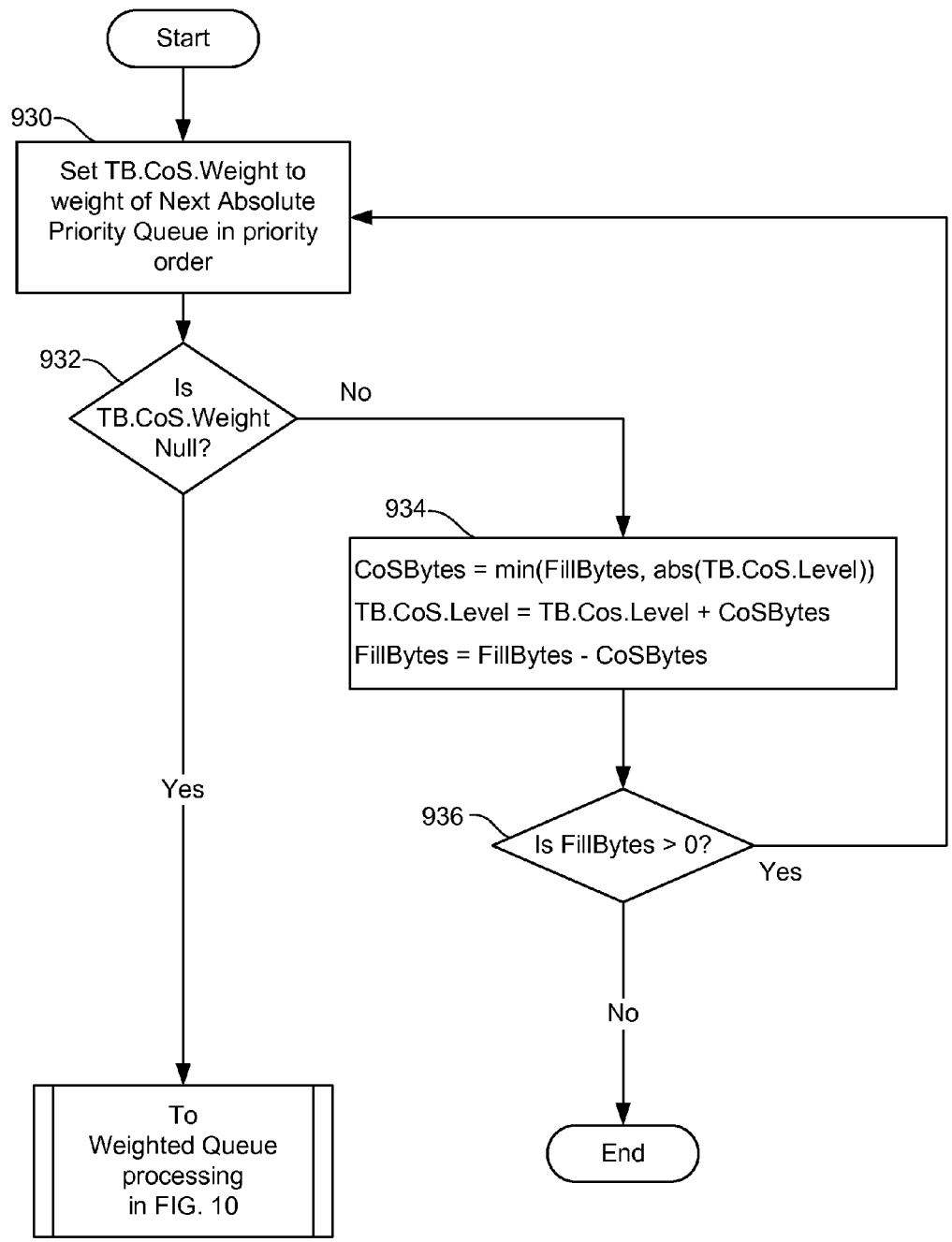
Figure 10:
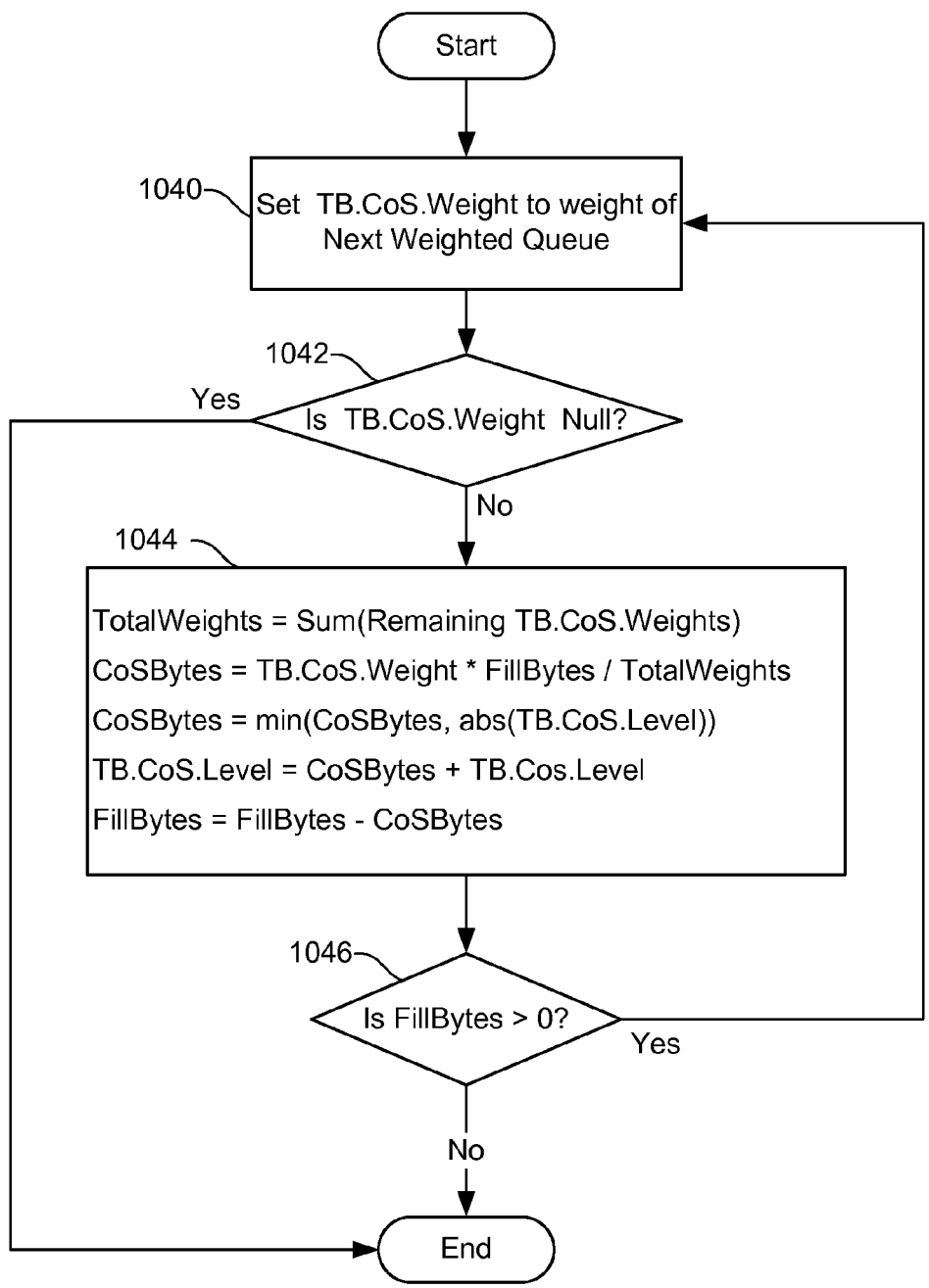

FIGS. 8, 9, and 10 illustrate an example of a process that may be used by a rate shaper to maintain the rate shaper's maximum fill rate. FIG. 8 is the main extended token bucket fill algorithm process. FIG. 9 is an extended token bucket fill algorithm sub process to handle absolute priority queues. FIG. 10 is an extended token bucket fill algorithm sub process to handle weighted queues.

Each rate shaper may be an extended Token Bucket (TB) implementation having several configurable parameters. "BucketDepth" is a parameter representing the depth of the token bucket in byte. This is synonymous with "BurstSize" and defines the limit on the amount of accumulated credit allowed. While credit is not exhausted in the token bucket, packets are sent without delay, such that the token bucket allows BucketDepth bytes to be sent at "line" rate as a burst.

"FillRate" is a parameter in bytes per second at which the token bucket fills with credits. This is synonymous with "MaxRate" which is a well-used broadband service term, for example, for the maximum sustained rate allowed for a subscriber's device. MaxRate is usually expressed in bits per second (bps), although for calculations, FillRate may be converted to bytes per second (Bps) to be compatible with the use of bytes for other variables.

Internally, each rate shaper token bucket may utilize some additional parameters, which may be used by the particular implementation strategy. "RecomputeByteThreshold" is a value of accumulated byte count at which to trigger a token bucket's recomputation. This value may be computed from the FillRate. An intent is to minimize jitter in packet send times induced by the token bucket recomputation but balanced by maximizing the time between recomputes. For example, assume that the average Internet packet size is 250 bytes, the default for maximum jitter is approximately 1 ms (this is derived from jitter sensitive voice data, where a 1 ms jitter per switching/routing hop is acceptable), and typical FillRates are 1 Mbps, 10 Mbps, 100 Mbps. A 1 ms maximum rate transfer at those rates is approximately 125 B, 1250 B, 12500 B. Thus, a reasonable tradeoff is to set the RecomputeByteThreshold to a minimum of 1000 B or 1 ms times the FillRate if that value is larger. That may cause a worse case jitter for low rate services of approximately 4 ms. Another additional parameter is "RecomputeTimeDelta," which is the maximum allowed time between token bucket computations. An example default value is currently 1 ms.

Each token bucket also maintains dynamic state values. Per-CoS (i.e., one for each CoS instance), a dynamic state value is "TB.CoS.Level," where the token bucket implementation maintains a token bucket level for each CoS. This parameter is required for computation of the delay to apply to a packet. It is not used to control burst transmit (when the token has a positive Level). This value is either zero (when the TB.Level is greater-than-or-equal to zero), or it is less-than zero when the TB.Level is less-than zero).

"TB.Level" is the byte count of credits (debits) in the token bucket. When this value is positive then the token bucket has accumulated credits and packets can be sent without delay. When this value is negative the token bucket is delaying packets by computing future deadline schedule transmit times. The delay computed for a packet depends on the TB.CoS.Level corresponding to the CoS for the packet.

"AccumulatedByteCount" is the count of bytes accumulated since the last token bucket compute and update. The RecomputeByteThreshold is the value of AccumulatedByteCount at which to trigger a TB recompute. If the AccumulatedByteCount including the current packet is less than RecomputeByteThreshold limit then the token bucket compute will result in the same future time value and does not update the token bucket state except to update the AccumulatedByteCount. If the AccumulatedByteCount is greater than RecomputeByteThreshold then a full token compute is performed.

"LastRecomputeTime" is a timestamp at indicating when the token bucket was last computed. If the current Time is greater than LastRecomputeTime plus RecomputeTimeDelta then a token bucket compute is performed. This avoids the token bucket state becoming stale when the throughput of packets (bytes) through the rate shaper is low.

In addition to the token bucket processing above, there is a periodic credit update to the token bucket required. This may be done at the same time as the AccumulatedByteCount triggered full compute. It requires computing the number of credits (bytes) to add to the TB.Level and each TB.CoS.Level by computing the time delta from the last credit update and current time.

The TB algorithm operates as follows. When the TB.Level is positive then the token bucket has credits to send within its BucketDepth burst size. If there is no other token bucket applicable for forwarding the packet then it is enqueued to the output current time QBlock. If there is another token bucket applicable, then that is also computed and may or may not result in a computed delay. While the TB.Level is positive, the TB.CoS.Level for each CoS is zero (TB.CoS.Level may be used only during deficit/delay processing). Conversely if any TB.CoS.Level is negative then TB.Level must also be negative.

When TB.Level is negative then the token bucket has no burst credits and packets are delayed by the token bucket. The delay (future time) is computed using the CoS-specific TB.CoS.Level. For per-packet processing, a value TB.AccumulatedByteCount is incremented by the packet length (bytes). In this way, each CoS for the token bucket maintains its own deficit (TB.CoS.Level) and so its induced delay is independent of the delay for the other CoS sharing the same token bucket except indirectly in the sense that the fill rate for the CoS is dependent on the activity of the other CoS for the token bucket.

The Recompute and Fill Algorithm for the TB is triggered when the TB.AccumulatedByteCount exceeds the RecomputeByteThreshold or when the elapsed time between the last fill algorithm run and current time exceeds the RecomputeTimeDelta. The Recompute and Fill Algorithm may be executed in-line with the input-side processing of the packet that caused the over-threshold condition (detection and recomputation are done before the token bucket result is generated for the packet).

Rate shaper instances may be processed by more than one thread. On the input side this may occur, for example, when link aggregation or a similar link bonding method is in use on the input port 670. In this case individual IP flows that are processed by the same rate shaper may be handled by different threads. On the output side this is generally the case because any input thread may be processing a packet destined to a common output CoS queue. When an input thread detects the RecomputeByteThreshold or RecomputeTimeThreshold trigger condition, then only one thread may actually be permitted to perform the calculation. If implemented using Intel's Data Plane Development Kit (Intel DPDK), this rate shaper dynamic state variable that acts as the thread interlock can be obtained using the "atomic" get-and-set instructions. The input thread that "gets" the "lock" may perform the recompute. An input thread that tests the "lock" and fails to get it may continue without performing a recompute.

Since the aggregate traffic rate through the rate shaper across all its CoS must conform to the FillRate (MaxRate), the fill algorithm used when filling the token bucket may be adjusted to allocate the fill bytes to each CoS according to their weights or absolute priority. Absolute priority may be used, for example, for delay-intolerant low-data-rate communication packets such as voice-over-Internet Protocol (VoIP) packets. The fill algorithm generates a per-CoS fill byte count for each CoS, which is then credited to that TB.CoS.Level.

Each CoS is assigned a weight. This can be done by explicit configuration or it can be done automatically using the WFQ CoS Weight configuration to get the per-CoS weight values. A weight can be either a negative number meaning absolute priority, or it can be a positive number. When positive that value defines the relative weight for the CoS. A simple and intuitive method for positive weights is to restrict their values to the range 1 to 100 and treat them as percentages. The sum of all positive weights is 100. A less constrained method is to allow the positive weight to be any number and determine its relative weight as its weight value divided by the sum of all positive weights. This method avoids requiring the sum of all weights to be a specific value at all times and is convenient when configured weight values are being changed.

The fill processing algorithm for the token bucket takes the FillBytes and processes these according to the following algorithm outline in FIGS. 8 to 10. The values TB.Level and TB.CoS.Level in FIG. 7 are the same values as used with the fill processing algorithm. The fill processing algorithm is performed as needed, rather than for every packet. A count may be kept of how many bytes have been processed since the last calculation, and when the number of bytes is reached, the fill processing algorithm is triggered. The fill processing algorithm may also be triggered when a time threshold is reached.

An over view of the process is that if the TB.Level is greater-than-or-equal to zero then simply add all FillBytes to TB.Level limiting the value to TB.BucketDepth. All TB.CoS.Level values must be zero. Otherwise continue and get a subset of CoS which have absolute priority and order them in priority descending order. This subset may be empty if absolute priority is not used. For each absolute priority CoS, if FillBytes is not equal to zero then compute the CoSBytes count to fill from FillBytes using CosBytes as the smaller of FillBytes and the absolute value of TB.CoS.Level. This means the CoS either takes all the FillBytes if the absolute value of TB.CoSLevel is greater-than-or-equal to FillBytes, or it takes enough FillBytes to make TB.CoS.Level equal to zero. For each absolute priority CoS, add CosBytes from above to TB.CoS.Level (i.e., TB.CoS.Level=TB.CoS.Level+CosBytes) and subtract the allocated CosBytes from FillBytes (i.e., FillBytes=FillBytes−CosBytes). If FillBytes is not equal to zero then for each weighted CoS compute the Bytes count to fill from FillBytes using the per-CoS weight and the sum of all CoS weights (WeightTotal) from: CoSBytes=FillBytes*CoS.Weight/WeightTotal.

Referring to FIG. 8, initially in step 812, FillBytes is set to the MaxRate times the elapsed time since the fill processing algorithm was triggered. Variable "StartTB.Level" is set equal to TB.Level, and TB.Level is incremented by adding FillBytes to TB.Level. Then TB.Level is compared (814) with TB.Depth. If TB.Level is greater than TB.Depth (814 "Yes"), then TB.Level is set equal to TB. Depth (816). If StartTB.Level is not less than zero (820 "No"), then the fill process ends. Otherwise, if StartTB.Level is less than zero (820 "Yes"), then for all CoS queues, set TB.CoS.Level to zero (822) and then end the process.

If TB.Level is not greater than TB.Depth (814 "No"), then determine (818) whether the TB.Level is greater than zero. If TB.Level is greater than zero (818 "Yes"), and if StartTB.Level is not less than zero (820 "No"), then the fill process ends. Otherwise, if StartTB.Level is not less than zero (820 "Yes"), then for all CoS queues, set TB.CoS.Level to zero (822) and then end the process. Otherwise, if TB.Level is not greater than zero (818 "No"), advance to the deficit fill process in FIG. 9.

Referring to FIG. 9, set (930) TB.CoS.Weight to the weight of the next absolute priority queue in priority order. If TB.CoS.Weight is not null (932 "No"), indicating that there is still an absolute priority CoS queue, then in 934, CoSBytes is set equal to the minimum of FillBytes and the absolute value of TB.Cos.Level, TB.CoS.Level is set equal to itself plus CoSBytes, and FillBytes is set equal to itself minus CoSBytes. In effect, this allocates fill bytes for this class of service, adding the FillBytes to the CoS's level and subtracting them from the available FillBytes.

A determination (936) is then made as to whether FillBytes is greater than zero. If it is not greater than zero (936 "No"), meaning there are no further fill bytes available, the process ends. Otherwise, if FillBytes is greater than zero (936 "Yes"), the process loops back to 930 to select a next absolute priority queue. This cycle continues until there are no further fill bytes to allocate (936 "No") or there are no further absolute priority queues (TB.CoS.Weight is Null, such that 932 "Yes"). When there are no further absolute priority CoS queues (932 "Yes"), the process advances to the weighted queue processing algorithm in FIG. 10.

Referring to FIG. 10, TB.CoS.Weight is set to the weight of the next weighted priority queue. If TB.CoS.Weight is not null (1042 "No"), meaning there is still a weighted priority queue to process, then the value TotalWeights is set equal to the sum of all of the remaining TB.CoS.Weights, which includes both the TB.CoS.Weight value of the current queue, and the weight values of all of the other weighted priority CoS queues to which fill bytes (i.e., tokens) have not yet been allocated. CoSBytes is set equal to TB.CoS.Weight times FillBytes divided by TotalWeights. CoSBytes is then set to the minimum of the just-set CoSBytes and the absolute value of TB.CoS.Level. TB.CoS.Level is then set to equal itself plus CoSBytes. FillBytes is set to itself minus CoSBytes. A determination 1046 is then made as to whether there are fill bytes remaining to be allocated. If there are (FillBytes>0, 1046 "Yes"), the process loops back and selects (1040) a next weighted queue. This loop continues until either there are no more weighted queues (TB.CoS. Weight is null, 1042 "Yes") or there are no fill bytes remaining to allocate (1046 "No"), at which point the fill processing algorithm ends.

An extended rate shaper may also be used in which there is a MaxBurstRate parameter that controls the transmission rate for traffic when the token bucket is in credit (i.e. operating in burst mode). This provides an additional parameter that specifies the rate at which packets can be sent while the token bucket has credits. That is, the extended rate shaper may control the rate of burst sending.

Referring back to 674 in FIG. 6, WRED processing may be split into input-side and output-side actions. On the input-side the output CoS queue WRED state is read to make a WRED decision. This requires read-only access to the output-side data. If the input-side decision is to drop the packet then that is done before any further input processing steps—in particular before rate shaping.

The output-side recomputes the WRED state for each CoS queue periodically. There is a trade-off between accuracy and overhead in the frequency of computation. For a single CoS queue, computation of WRED state requires update of the EWMA of the queue depth. The EWMA computation can be done incrementally using the previous EWMA value. For example, computing the CoS queue depth (in bytes) may be performed by summing all the QBlock ByteCount values for QBlocks that are from the CurrentQBlock (e.g., 112a) up to the maximum QBlock (e.g., 112n). This may require a sum of around 128 ByteCount instances. The minimum periodicity for computation may be, for example. 1 millisecond. A 1 millisecond periodicity matches 20K 64 bytes packets at 10 Gbps wire rate which should be insignificant per-packet overhead. The method avoids maintaining a total byte count in the CoS queue because that would require multi-producer update and at the rate of every packet. That update would be in addition to the QBlock ByteCount which it may maintain (and which has the same requirements). Once the output WRED computation has been done the WRED state in the CoS queue is updated.

Figure 11:
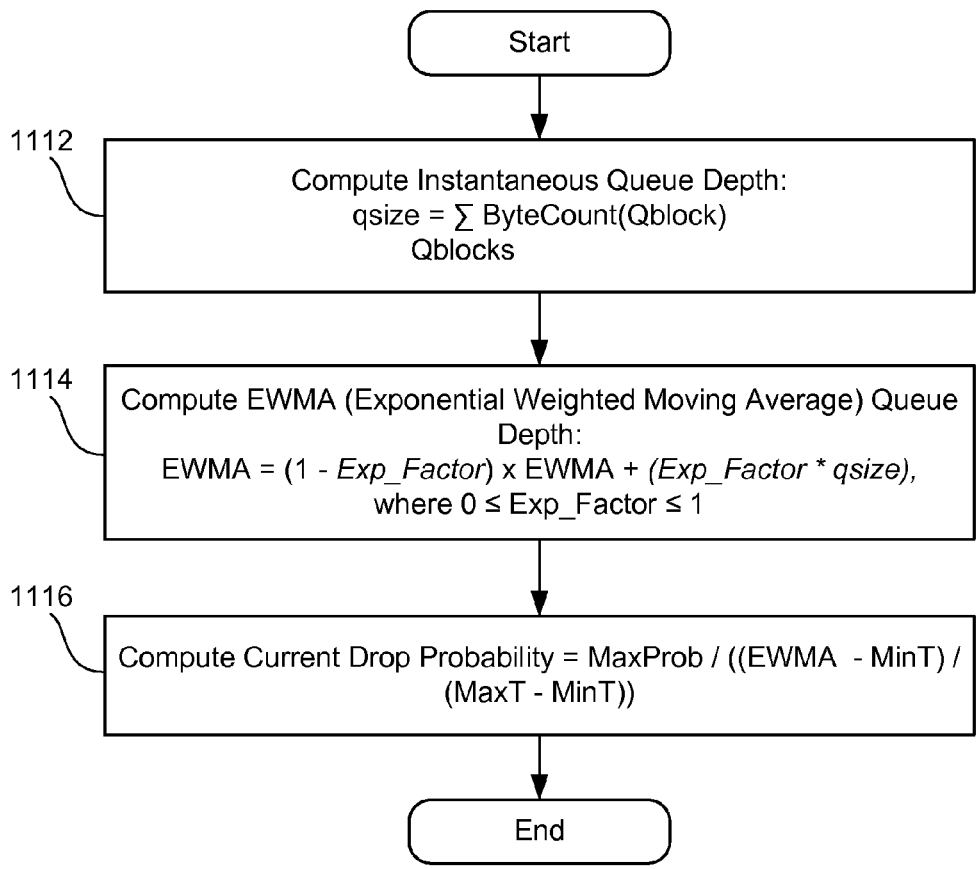
FIG. 11 illustrates an example of a process that may be used by the output stage to periodically calculate a drop probability per CoS queue.

FIG. 11 illustrates an example of a process that may be used by the output stage to periodically calculate a drop probability per CoS queue that is part of the WRED computation. The output processing computes WRED periodically (time-based e.g., 1 ms or 10 ms parameter), with there being a tradeoff between accuracy and frequency. This calculation is performed on a per CoS queue basis.

As an initial step, the instantaneous queue depth "qsize" is calculated (1112), where qsize is equal to the sum of the ByteCounts of all the QBlocks 112 in the queue 110. An exponential weighted moving average (EWMA) queue depth is then calculated (1114), where EWMA=(1−Exp_Factor)×EWMA+(Exp_Factor*qsize), and where "Exp_Factor" is an exponential weighting factor. The exponential weighting factor is a configured floating point number in the range of zero to one, where Exp_Factor is greater-than-or-equal-to zero, and less-than-or-equal to one. The larger the exponential factor (in range 0 . . . 1), the faster the EWMA changes, where an exponential factor of 1 just measures the actual queue size and an exponential factor of 0 means the current EWMA never changes. An example default value is 0.1.

Figure 12:
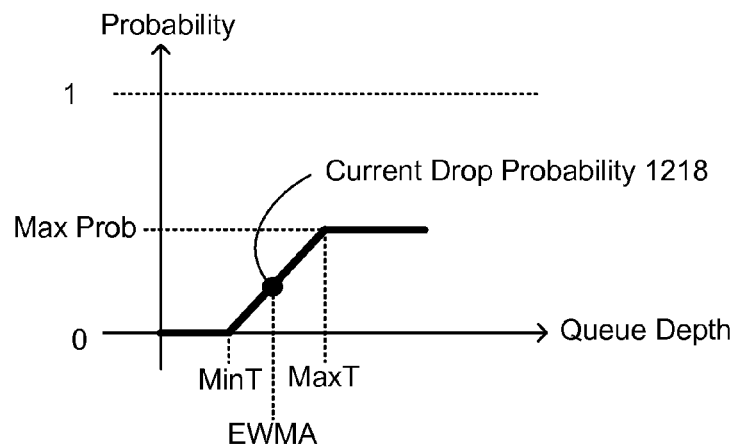
FIG. 12 is a graph demonstrating the drop probability as calculated by the process in FIG. 11.

The current drop probability is then computed (1116), where the packet drop probability for the CoS queue is equal to MaxProb/((EWMA minus MinT)/(MaxT minus MinT)). The maximum probability "MaxProb," the minimum threshold "MinT," and the maximum threshold "MaxT" are all configured values. MinT is a floating point number in the range 0 . . . 1 which defines the low threshold at which the drop probability computed by WRED may be non-zero. An example default value is 0.25 which means that the gateway will compute the threshold as 0.25*QueueDepthBytes. MaxT is a floating point number in the range 0 . . . 1 which defines the high threshold at which the drop probability for WRED is set to maximum probability (MaxProb). An example default value is 0.75 which means that the gateway will compute the threshold as 0.75*QueueDepthBytes. MaxProb is a floating point number in the range 0 . . . 1 which defines the maximum limit of the computed drop probability. When the EWMA queue depth is at or above MaxT threshold, then the drop probability is capped at this value. An example default value is 0.5. FIG. 12 is a graph demonstrating the drop probability 1218 as calculated by the process in FIG. 11.

Figure 13:
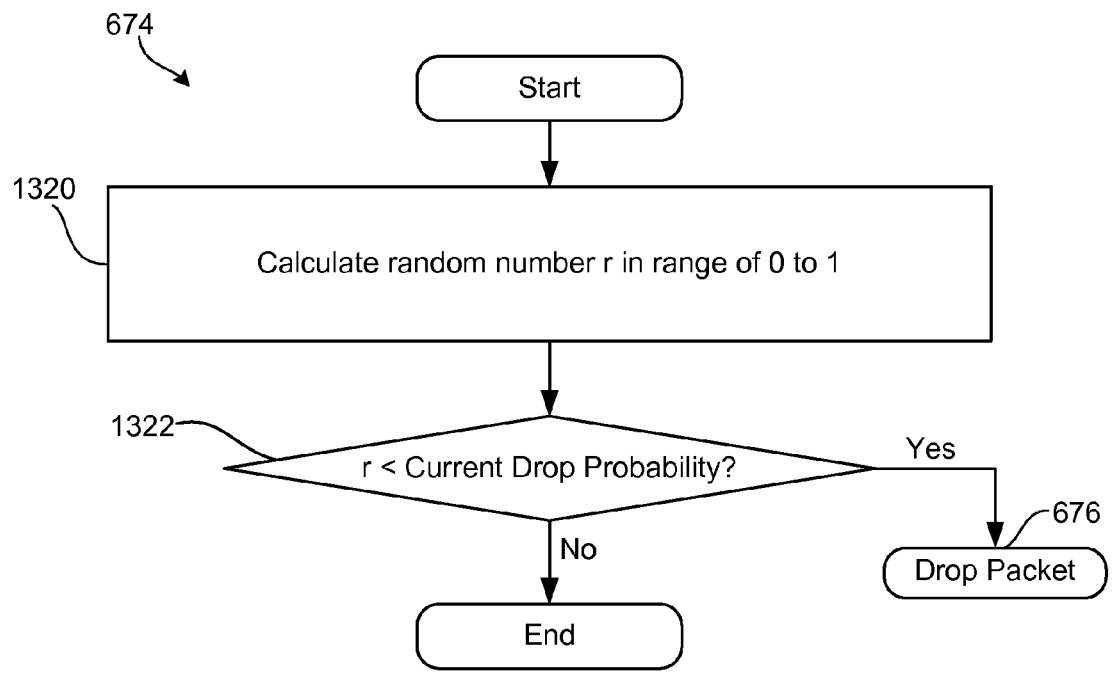
FIG. 13 illustrates an example of an improved process that may be used by a portion of the input stage in FIG. 6 to implement Weighted Random Early Detection (WRED), utilizing the drop probability according to the process in FIG. 11.

FIG. 13 illustrates an example of the process that may be used by a portion of the input stage in FIG. 6 to implement Weighted Random Early Detection (WRED), utilizing the drop probability according to the process in FIG. 11. For each CoS queue 110, there is an associated current "drop" probability value associated with the queue. The input-side process computes (1320) a random number "r" in range of 0 to 1. If r is less than the current drop probability for the CoS queue (1322 "Yes"), then the packet is dropped (676). Otherwise, the packet is passed along as illustrated in FIG. 6. The "weighting" in WRED is by virtue of each COS queue being itself weighted.

FIGS. 14 to 20 illustrate an example of a process to implement a hybrid Weighted Fair Queue (WFQ) scheduler that may be used in the output stages of the improved queueing model as illustrated in FIGS. 1 and 5.

A Weighted Fair Queue (WFQ) structure corresponds to an instance of WFQ scheduling which consumes packets queued on multiple CoS queues 110 attached to the WFQ instance 120 and produces packets for output onto a physical port or an aggregate Virtual Port. The method uses variant WFQ in which the WFQ can be configured using pure Weighting (classic WFQ). Or it can be configured using priority in which each CoS queue 110 has a relative priority serviced in strict priority order. Or it can be configured as a hybrid in which one or more CoS queues have a priority while others have a weight. In the hybrid case, priority queues always have precedence, any remaining bandwidth is shared by weight between the weighted queues.

Where link aggregation or link bundling is used, each member of the bundle may have its own WFQ instance and operates for output processing purposes independently of the other bundle members. The input processing determines the bundle member for output during its forwarding determination. That is, link aggregation is essentially independent of the fast path processing. The output bundle member to use for the forwarding result is determined during setup of an IP flow, for example, using a hash-based allocation of flows to members to achieve reasonable balancing between bundle members.

Each Weighted Fair Queue scheduler 120 instance processes the set of CoS queues 110 attached to it. Each CoS queue may have a CoS.Weight parameter. For implementation convenience, this parameter may be a negative number which denotes absolute priority and where the relative priority of CoS queues with absolute priority is in order of most negative value first. Otherwise the parameter is a positive number which denotes the relative weight for the CoS queue. From the set of CoS queues with positive CoS.Weight, the sum of those weights (TotalWeights) is used to compute the relative weight of each queue from: CoS.Weight/TotalWeights An output processing thread may be assigned a set of WFQ schedulers 120 to process. The thread may be performed by polling in a loop each of those WFQ schedulers. For each WFQ instance, an iteration of the polling loop uses a byte pool of fixed size as representative of the shared transmission bandwidth that WFQ instance uses. The algorithm then allocates from that byte pool to each CoS queue 110 using absolute priority and weight to determine what packets are to be sent from each CoS queue 110 that has packets to send.

Figure 14:
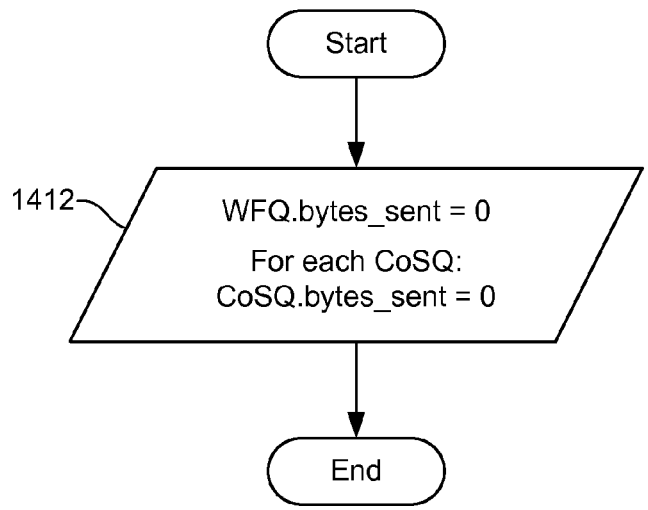
FIG. 14 illustrates an example of a process that may be periodically executed in association with each hybrid WFQ scheduler to define the period over which the weighted CoS queues share bandwidth.

FIG. 14 illustrates an example of a process that may be periodically executed in association with each hybrid WFQ scheduler to define the period over which the weighted CoS queues share bandwidth. To provide correct weighted processing results, a time quantum is used (e.g., 10 ms) during which byte counts are maintained for each CoS queue 110 and for the WFQ instance itself. These counters record the number of bytes sent during the current time quantum. As illustrated at 1412, at the end of the time quantum these counters are simply reset to zero. The time quantum method ensures that bytes sent are measured over a sufficiently long period to ensure a fair weighted result.

Figure 15:
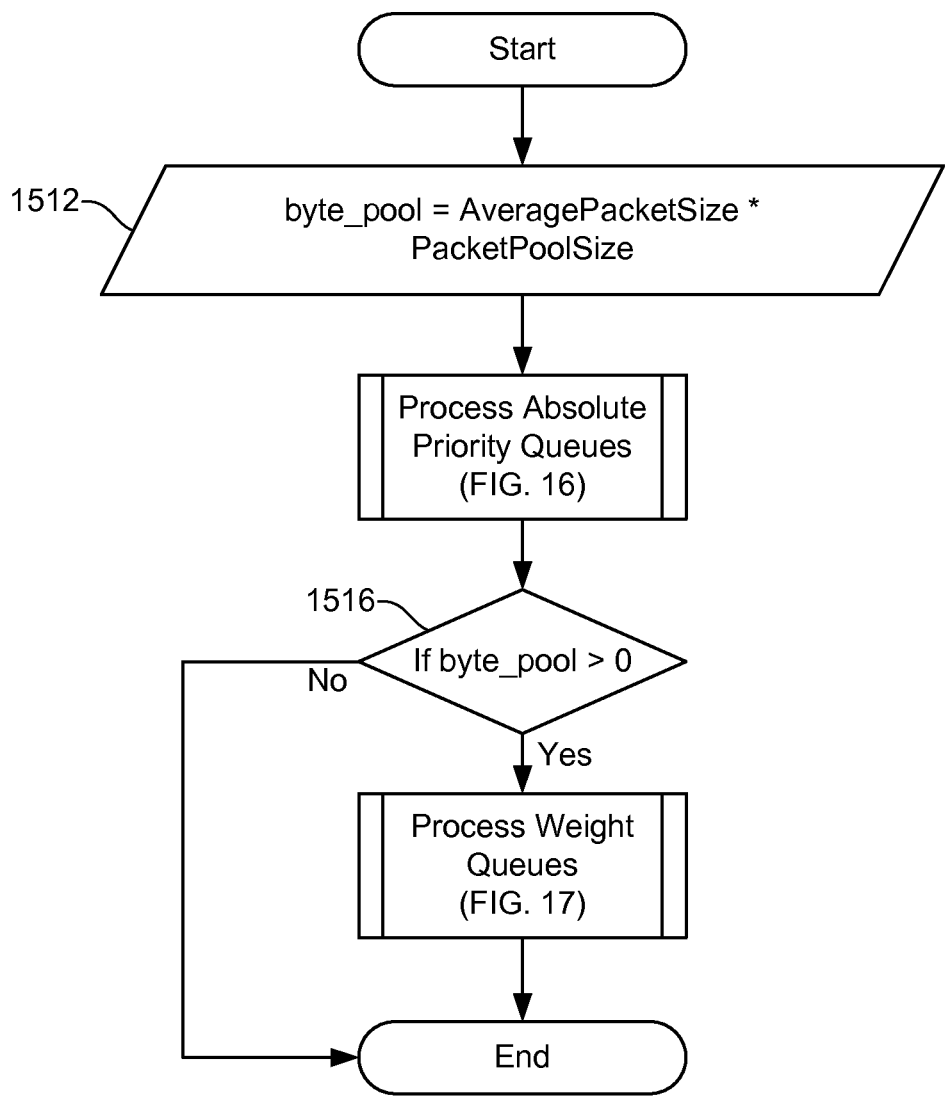
FIGS. 15 to 20 illustrate an example of a process to implement a hybrid Weighted Fair Queue (WFQ) scheduler, that may be used in the output stages of the improved queueing model as illustrated in FIGS. 1 and 5.

FIG. 15 begins illustration of the example WFQ process. This process executes periodically for each WFQ instance, and executes under a polling method where each WFQ processed by a thread has this process executed. At 1512, a byte_pool value is calculated (in bytes), where byte_pool is equal to the average packet size (in bytes) times the packet pool size (a dimensionless integer). At the start of a time quantum, the byte_pool corresponds to an amount of data that can be sent through the port 160 (or otherwise scheduled for transmission if directed to a virtual port) before the next time quantum. The process then handles processing of the absolute priority queues, using the process in FIG. 16. After that, if the byte_pool is still greater than zero (1516 "Yes"), the process handles the weighted queues in accordance with FIG. 17. Otherwise, if the byte_pool is empty (15 "No"), the WFQ process ends.

Figure 16:
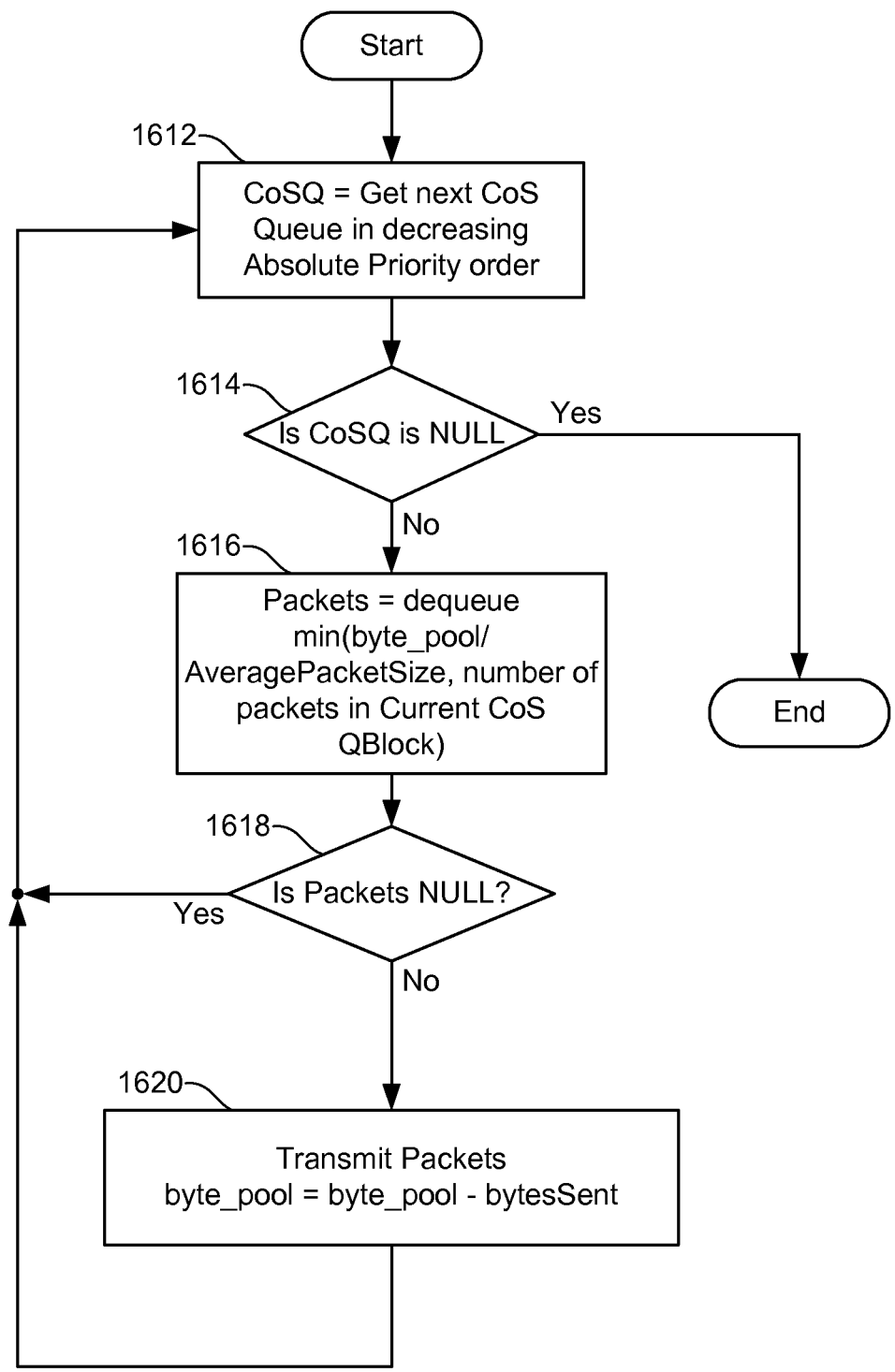

FIG. 16 illustrates the absolute priority queues WFQ sub-process. Initially, "CosQ" is set (1612) to the next CoS queue in decreasing absolute priority order. The ordered priority of the absolute priority queues is determined based on the magnitude (i.e., the absolute value) of the negative CoSQ.weight value, where a larger value means higher absolute priority. If CoSQ is null (1614 "Yes"), this means that there are no remaining absolute priority queues to process, and the sub-process ends (returning to FIG. 15). Otherwise (1614 "Yes"), a "Packets" value is calculated (1616), where Packets is set to specify the number of packets to dequeue up to from the current CoSQ.QBlock. Packets is equal to the lesser of the byte_pool divided by the average packet size and the number of packets in the current CoS QBlock. If Packets is not Null (1618 "No"), the WFQ scheduler transmits packets (1620), and the byte_pool is decremented by the bytes sent in the transmission. After transmission, or if the Packets value is Null (1618 "Yes"), the process loops back to select a next CoS queue.

Figure 17:
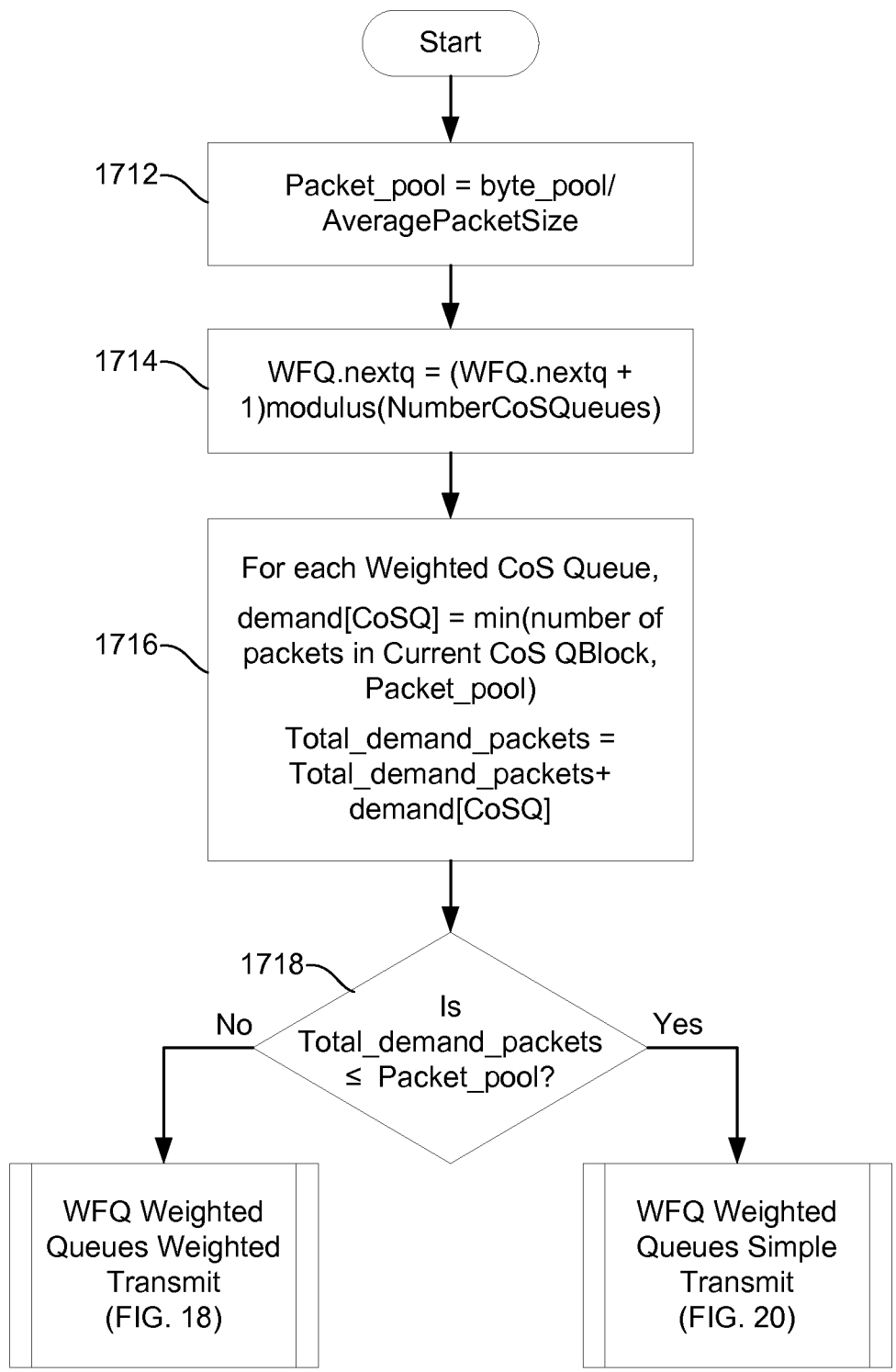

FIG. 17 illustrates the weighted priority queues WFQ sub-process. The packet_pool value is set (1712) equal to the remaining byte_pool divided by the average packet size. A WFQ attribute "WFQ.nextq" is set equal to (WFQ.nextq+1)modulus(NumberCoSQueues), where "NumberCoSQueues" is the number of CoS queues 110 scheduled by the WFQ 120. This means take (WFQ.nextq+1) and find the modulus of the total number of CoS queues attached to that WFQ instance (e.g., if WFQ.nextq+1=10, and NumberCoSQueues equals 8, then 10modulus8 equals 2). The purpose of the WFQ.nextq value is to change the starting Weight Queue for iteration at each period so that no queue gets unfair bandwidth share due to algorithm rounding errors. In 1716, for each weighted CoS queue, "demand[CoSQ]" is set equal to the lesser of the number of packets in current CoS Qblock and the packet_pool. Also, a value "total_demand_packets" is set equal to total_demand_packets+demand[CoSQ]. The total_demand_packets is then compared (1718) with the "packet_pool." If total_demand_packets is less-than-or-equal-to packet_pool (1718 "Yes"), the process advances to the weighted queues simple transmit sub-process in FIG. 20. Otherwise (1718 "No") the process advances to the weighted queues weighted transmit sub-process in FIG. 18.

Figure 18:
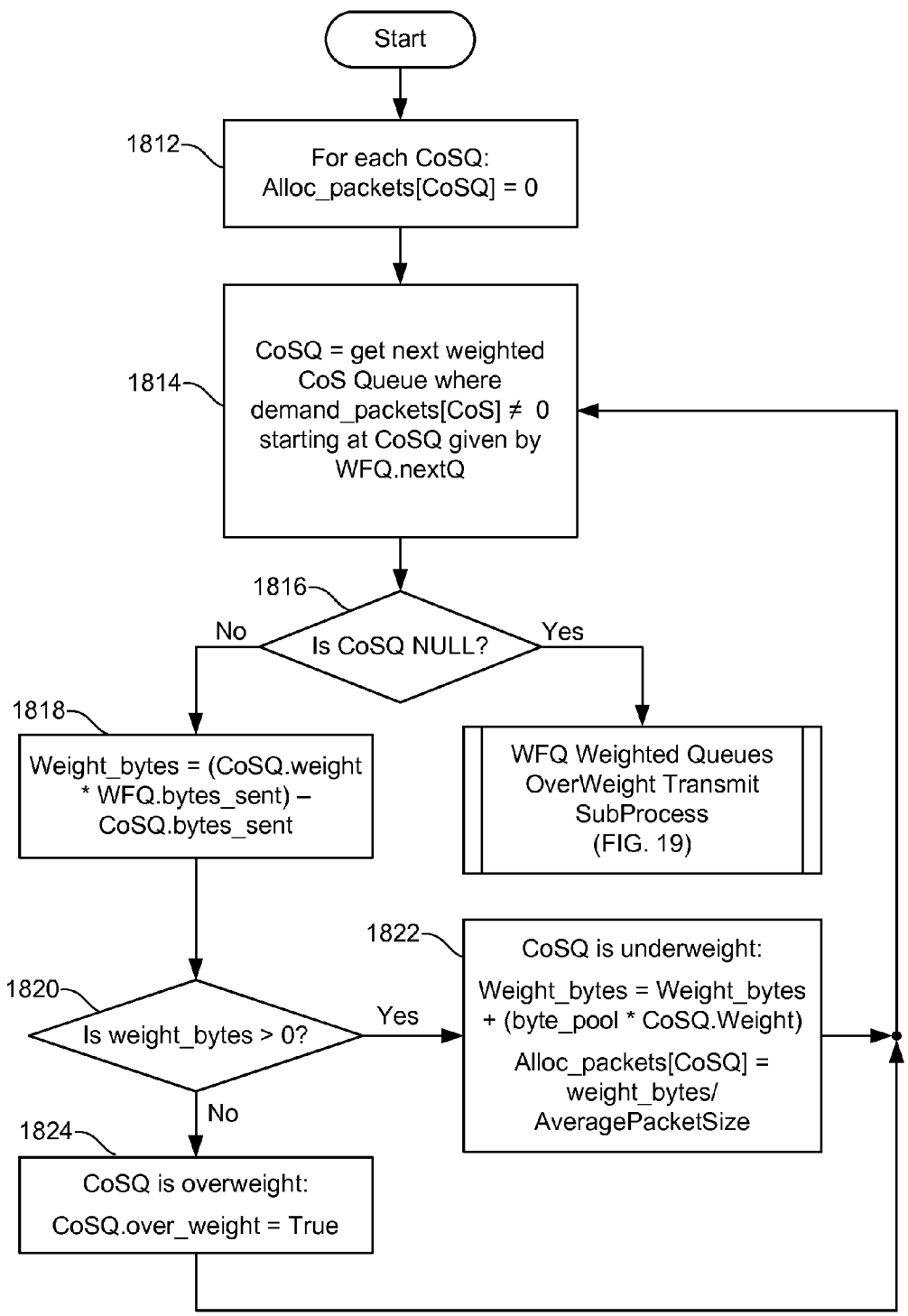

FIG. 18 illustrates the weighted queues WFQ weighted transmit sub-process. In step 1812, for each CoS queue, the number of allocated packets (i.e., Alloc_packets[CoSQ]) are set to zero. Then, CoSQ is set (1814) to the next weighted CoS queue where the demand_packets are not equal to zero, starting at the CoS queue given by the value WFQ.nextQ. If CoSQ is not Null (1816 "No"), meaning that there is a non-empty QBlock at a head of a CoSQ that has not been processed by the WFQ scheduler, a "weight_bytes" for the CoS queue is set (1818) equal to (CoSQ.weight*WFQ.bytes_sent)−CosQ.bytes_sent. A determination (1820) is then made as to whether the weight_bytes are greater than zero. If weight_bytes is greater than zero, the CoS queue is underweight.

A queue is underweight if it has had less than its weighted share of bandwidth during this time quantum (as discussed above with FIG. 14). A queue is overweight if it has had more than its weighted share of bandwidth during this time quantum. Such under or over weight results can occur because queues are processed in units of packets which are of variable size but the weighted share is measured in units of bytes derived from the length of the packets.

In step 1822, the weight of the underweight queue is increased, setting weight_bytes equal to weight_bytes plus (byte_pool*CoSQ.Weight). Also, Alloc_packets[CoSQ] is set equal to the weight_bytes divided by the average packet size. In the alternative, if weight_bytes is not greater than zero (1820 "No"), the CoS queue is overweight, which may then be noted in a CoS queue attribute "CoSQ.over_weight." After step 1822 and after step 1824, the process loops back to 1814 and a next weighted non-empty CoS queue is selected. This continues until CoSQ is Null (1816 "Yes") indicating that there are no more non-empty weighted CoS queues, at which point the process advances to a weighted queues WFQ overweight transmit sub-process in FIG. 19.

Figure 19:
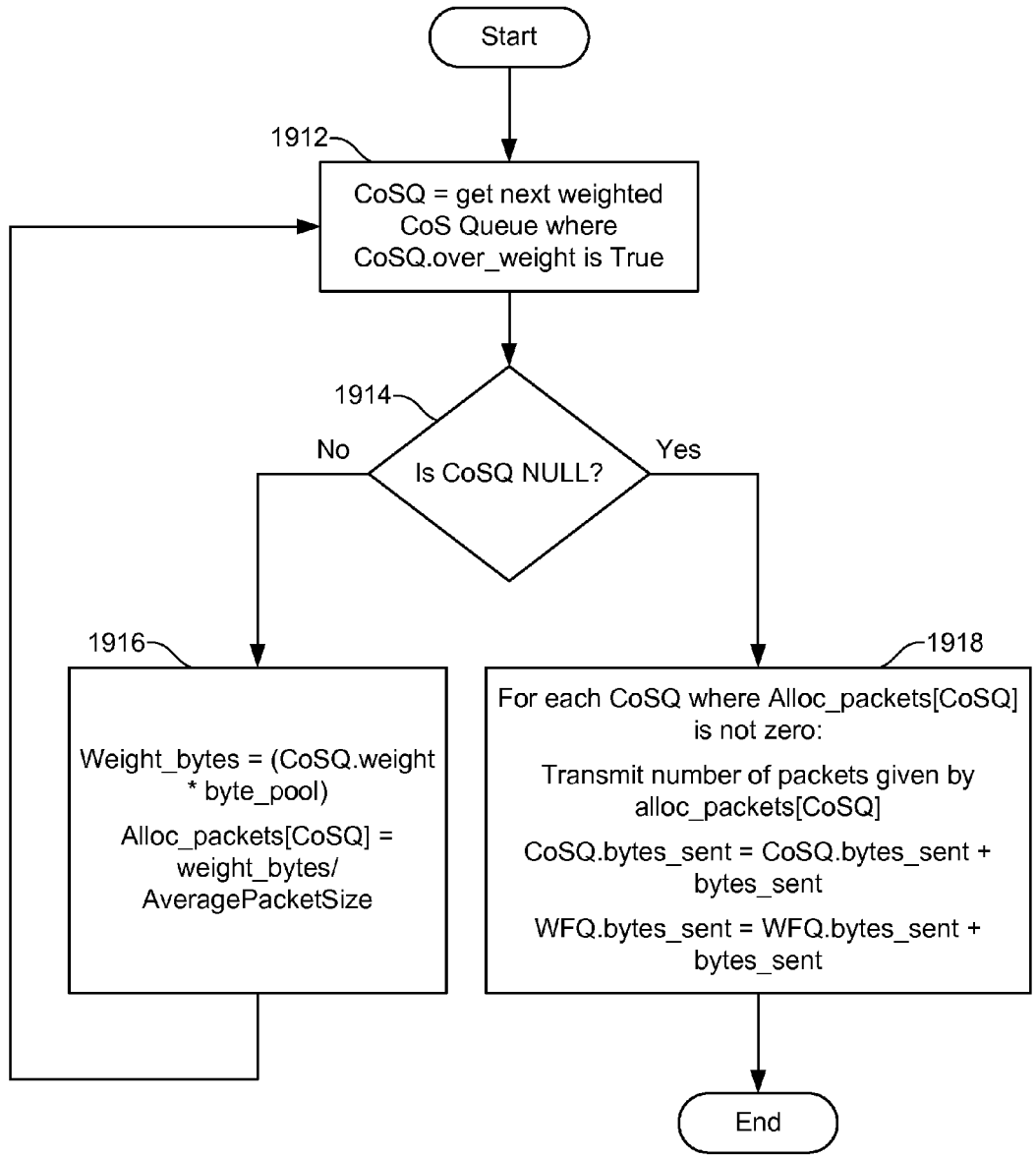

FIG. 19 illustrates the WFQ weighted queues overweight transmit sub-process. The process begins by setting (1912) CoSQ equal to the next weighted CoS queue where the CoSQ.over_weight attribute is true (as set in 1824). If CoSQ is not Null (1914 "No"), meaning that there is an overweight queue to process, then in step 1916, weight_bytes is set equal to (CoSQ.weight*byte_pool), and Alloc_packets [CoSQ] is set equal to weight_bytes divided by AveragePacketSize. The process then loops back to 1912 to process the next overweight queue. This continues until there are no more overweight queues to process (1914 "Yes"), at which point the sub-process advances to step 1918. In step 1918, For each CoSQ where Alloc_packets [CoSQ] is not zero: the WFQ transmits the number of packets given by alloc_packets[CoSQ], CoSQ.bytes_sent is set equal to CoSQ.bytes_sent plus bytes_sent, and WFQ.bytes_sent is set equal to WFQ.bytes_sent+bytes_sent. The sub-process then ends.

Figure 20:
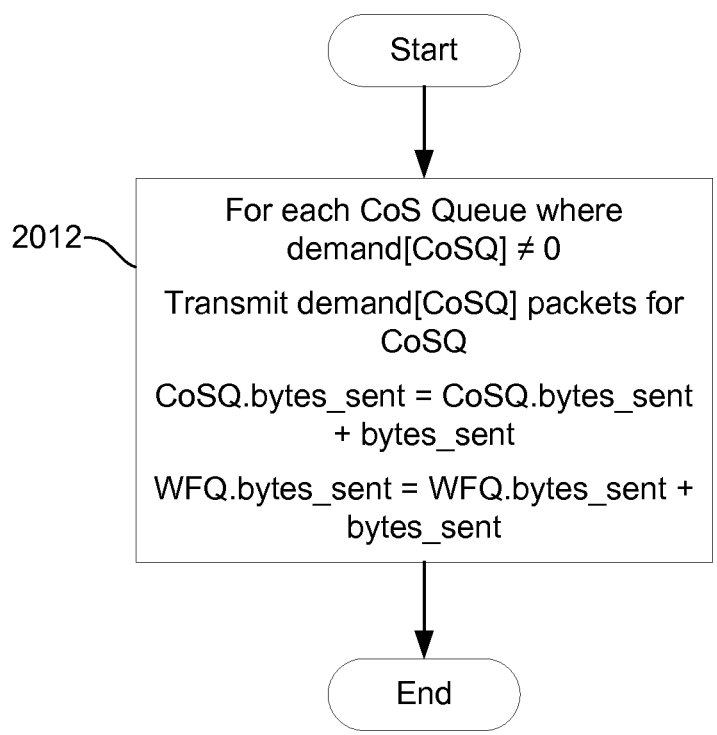

FIG. 20 illustrates a WFQ weighted queues simple transmit sub-process. In step 2012, for each CoS queue where demand[CoSQ] ≠0, the WFQ scheduler instance 120 transmits demand[CoSQ] packets for the CoS queue, CoSQ.bytes_sent is set equal to CoSQ.bytes_sent plus the bytes_sent, and WFQ.bytes_sent is set equal to WFQ.bytes_sent plus the bytes_sent.

Another parameter that may be used with a WFQ instance is "OutputEntity," which is the name of the entity to which this WFQ instance is bound and to which it sends its output packets. As illustrated in FIG. 1, this is the name of a physical port 160. However, a virtual port may also be used.

Each WFQ instance 550 has a set of CoS queues. The number of CoS queue instances for a WFQ may be a global configuration parameter, such that the number of output CoS queue instances is the same for all WFQ instances.

Figure 21:
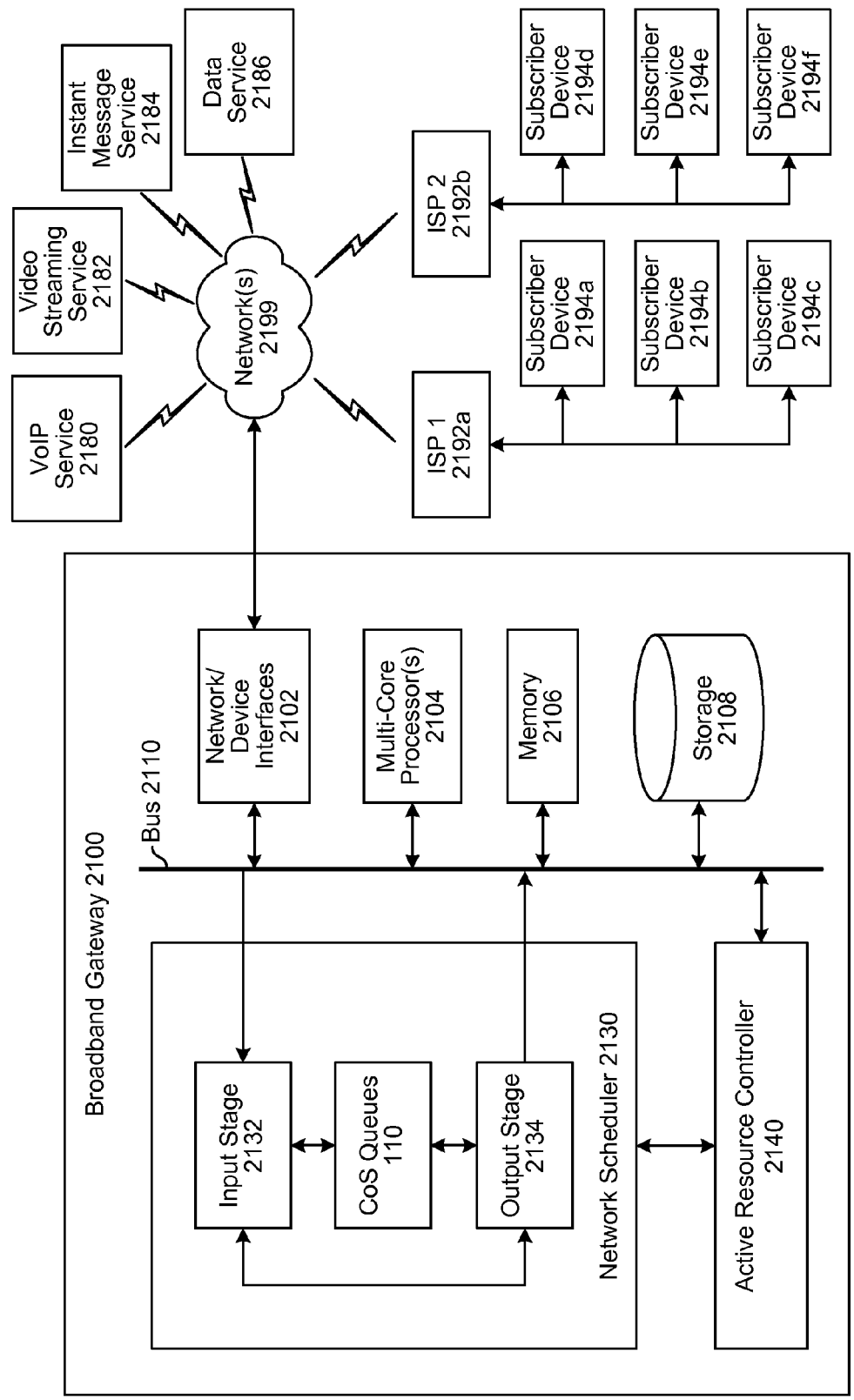
FIG. 21 is a block diagram conceptually illustrating example components of a system including a broadband gateway that includes a network scheduler executing the improved queueing model.

FIG. 21 is a block diagram conceptually illustrating example components of a system including a broadband gateway that includes a network scheduler executing the improved queueing model. In operation, the broadband gateway 2100 of the system may include computer-readable and computer-executable instructions that reside on the gateway 2100, as will be discussed further below.

The gateway 2100 may include an address/data bus 2110 for conveying data among components within the gateway 2100. Each component within the gateway 2100 may also be directly connected to other components in addition to (or instead of) being connected to other components across the bus 2110.

The gateway 2100 may include one or more controllers/processors 2104, that may each include a central processing unit (CPU) for processing data and computer-readable instructions, and a memory 2106 for storing data and instructions. The memory 2106 may include volatile random access memory (RAM), non-volatile read only memory (ROM), and/or other types of memory. The gateway 2100 may also include a data storage component 2108, for storing data and controller/processor-executable instructions (e.g., instructions to perform the process and algorithms illustrated in FIGS. 7 to 11, and 13 to 20). The data storage component 2108 may include one or more non-volatile storage types such as magnetic storage, optical storage, solid-state storage, etc. The gateway 2100 may also be connected to removable or external non-volatile memory and/or storage (such as a removable memory card, memory key drive, networked storage, etc.).

Computer instructions for operating the gateway 2100 and its various components may be executed by the controller(s)/processor(s) 2104, using the memory 2106 as temporary "working" storage at runtime. The computer instructions may be stored in a non-transitory manner in non-volatile memory 2106, storage 2108, or an external device. Alternatively, some or all of the executable instructions may be embedded in hardware or firmware in addition to or instead of software.

The gateway 2100 includes network/device interfaces 2102. A variety of components may be connected through the interfaces 2102, which include the network input port(s) 670 and network output port(s) 160. These interfaces 2102 may connect the gateway 2100 to one or more networks 2199. Among other ports that may be supported are Ethernet ports, wireless local area network (WLAN) (such as WiFi) radio connection, and connections to a wireless communication network such as a Long Term Evolution (LTE) network or WiMAX network. Through the network 2199, the system may be distributed across a networked environment.

The gateway 2100 includes a network scheduler module 2130 that executes the Future Time Hybrid Scheduling (FTHS), implementing fastpath packet forwarding. An input stage 2132 of the network scheduler 2130 performs input processing, such as that discussed in conjunction with FIGS. 6, 7, 8, 9, 10, and 13. The output stage 2134 of the network scheduler 2130 performs output processing, such as that discussed in conjunction with FIGS. 1, 5, 11, 14, 15, 16, 17, 18, 19, and 20.

The input stage 2132 may uses a single CPU core of the multi-core processor(s) 2104 to process packets received from one or more input ports 670. The result of processing a packet by the input stage 2132 is to enqueue it to a queue 110, and more specifically a QBlock 112, from which it is then processed by the output stage 2134. The queues 110 may be physically resident in memory 2106.

The Output Processing method uses a single CPU core of the multi-core processor(s) 2104 to process packets for output to one or more output ports 160. Preferably, different processor cores are used for the input and output stages. Both the input stage 2132 and the output stage 2134 use a run-to-completion implementation in which the method polls its input(s) for packets to process and processes each packet to completion—enqueuing each packet to the appropriate output queue.

The gateway 2100 may also include an active resource controller (ARC) 2140. The ARC performs functions such as network analytics, determining packet traffic statistics to characterize downstream restrictions on bandwidth. The ARC 2130 and the network scheduler 2130 can both be instantiated as virtual machines so that they provide a virtualized software-only broadband service control solution.

Among other approaches, the network scheduler 2130 may be implemented using Intel's Intel Data Plane Development Kit (DPDK). The DPDK is a software library of functions which can be used to optimize packet forwarding performance within a software-only implementation. It exploits various features of modern general-purpose server CPU technology. However, this design can be implemented in different environments including non-DPDK.

In the FTHS method, there are no per-device queues on the output side and, there are only per-CoS queues which are shared by all devices. This reduces the number of queues to a small enough number that software can use a polling method to find packets for transmission without a significant loss of throughput due to polling empty queues.

The system in FIG. 21 further illustrates examples of various upstream and downstream devices. VoIP service 2180, video streaming service 2182, instant-message service 2184, and data service 2186 illustrate different services that may send packets associated with different classes of service (CoS). For example, packets from the VoIP service 2180 may be afforded absolute priority, whereas packets from the other services may each be assigned a different class, and may each have a different weighted priority.

Internet Service Provider (ISP) 1 2192a and ISP 2 2192b illustrate downstream networks that may have different bottlenecks, and therefore need different downstream rate shaping. Likewise, the different packet recipient devices, such as subscriber devices 2194a to 2194f, may each rate shaping needs, such as if the input buffers on the subscriber devices are of different sizes, and/or their connections to the ISPs 2192 are associated with different contractual data rate limits.

Multiple gateways 2100 may be employed in a single system. In such a multi-device system, each of the gateways 2100 may include different components for performing different aspects of the FTHS process. The multiple gateways may include overlapping components. The components of gateway 2100 as illustrated in FIG. 21 is exemplary, and may be a stand-alone device or may be included, in whole or in part, as a component of a larger device or system. Among other things, the network scheduler 2130 and the ARC 2140 may be separate devices.

The network scheduler 2130 and the ARC 2140 may be implemented using OpenFlow models for controlling the packet forwarding behavior of the gateway 2100. OpenFlow is a communications protocol that gives access to the forwarding plane of a network switch or router over a network. OpenFlow enables controllers to determine the path of network packets through the network of switches. However, this design is not specific to OpenFlow—it could be realized in any environment that provides a method to program the actions to be taken when forwarding a packet (such as a rate shaper action).

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, network routers, broadband gateways, and network packet flow control, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The process flows of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A method of scheduling packets for transmission over a network via a gateway device, comprising:

configuring, at the gateway device, a first plurality of queues to each have a first scheduled time, where the first plurality of queues is associated with a first class of service (CoS), the first scheduled time of each of queue of the first plurality of queues is different, and packets stored in each respective queue of the first plurality of queues become available for dequeuing at the first scheduled time of the respective queue;

configuring, at the gateway device, a second plurality of queues to each have a second scheduled time, where the second plurality of queues is associated with a second CoS, the second scheduled time of each of queue of the second plurality of queues is different, and packets stored in each respective queue of the second plurality of queues become available for dequeuing at the second scheduled time of the respective queue;

receiving a first packet at the gateway device, directed to a first device;

determining, by the gateway device, that the first packet is associated with the first CoS;

determining, by the gateway device, that the first packet is to be enqueued in the first plurality of queues based on the first CoS;

determining, by the gateway device, a first rate shaper and a second rate shaper of a plurality of rate shapers to apply to the first packet;

computing, by the gateway device, a first future time for transmission of the first packet over the network to produce a first flow rate of the first rate shaper;

computing, by the gateway device, a second future time for transmission of the first packet over the network to produce a second flow rate of the second rate shaper;

determining, by the gateway device, that the first future time is later than the second future time;

selecting, by the gateway device, a first queue of the first plurality of queues into which to enqueue the first packet based on the first queue having a first scheduled time that is closest to the first future time while being equal-to-or-sooner than the first future time;

enqueuing, by the gateway device, the first packet into the first queue;

dequeuing, by the gateway device, packets from the first plurality of queues and from the second plurality of queues for transmission over the network, where the first packet is dequeued from the first queue at or after the first schedule time of the first queue;

transmitting, by the gateway device, the first packet to the first device via the network after the first packet is dequeued;

configuring, by the gateway device, a third plurality of queues to each have a third scheduled time, where the third plurality of queues is associated with the first CoS, the third scheduled time of each of queue of the third plurality of queues is different, and packets stored in each respective queue of the third plurality of queues become available for dequeuing at the third scheduled time of the respective queue;

configuring, by the gateway device, a fourth plurality of queues to each have a fourth scheduled time, where the fourth plurality of queues is associated with the second CoS, the fourth scheduled time of each of queue of the fourth plurality of queues is different, and packets stored in each respective queue of the fourth plurality of queues become available for dequeuing at the fourth scheduled time of the respective queue;

imposing, by the gateway device, a first aggregate rate to packets dequeued from the first plurality of queues and the second plurality of queues prior to transmitting those packets over the network to a first plurality of devices;

imposing, by the gateway device, a second aggregate rate to packets dequeued from the third plurality of queues and the fourth plurality of queues prior to transmitting those packets over the network to a second plurality of devices; and determining, by the gateway device whether the first device is of the first plurality of devices or of the second plurality of devices, wherein the enqueuing of the first packet to the first queue of the first plurality of queues is further based on the first device being of the first plurality of devices.

2. The method of claim 1, wherein the first rate shaper is an upstream rate shaper, the first flow rate being an upstream flow rate characterizing a first flow of packets prior to reaching the gateway device, and the second rate shaper is a downstream rate shaper, the second flow rate being a downstream flow rate characterizing a second flow of packets over the network from the gateway device to the first device.

3. The method of claim 1, wherein the first rate shaper is configured to calculate future times based on a CoS of each packet, the first future time being based in part on the first packet being of the first CoS.

4. The method of claim 1, further comprising:
receiving a second packet at the gateway device, directed to a second device;
determining, by the gateway device, that the second packet is associated with the first
determining, by the gateway device, that the second packet is to be enqueued in the first plurality of queues based on the first CoS;
determining, by the gateway device, a third rate shaper and a fourth rate shaper to apply to the second packet;
computing, by the gateway device, a third future time for transmission of the second packet over the network to produce a third flow rate of the third rate shaper;
compute, by the gateway device, a fourth future time for transmission of the second packet over the network to produce a fourth flow rate of the fourth rate shaper;
determining, by the gateway device, that the fourth future time is later than the third future time;
selecting, by the gateway device, a second queue of the first plurality of queues into which to enqueue the second packet based the second queue having a first scheduled time that is closest to the fourth future time while being equal-to-or-sooner than the fourth future time;
enqueuing the second packet into the second queue;
dequeuing the second packet from the second queue at or after the first schedule time of the second queue; and
transmitting the second packet to the second device via the network after the second packet is dequeued.

5. The method of claim 1, further comprising:
assigning a new first scheduled time to the first queue after all packets of the first queue are dequeued, moving the first queue from a head of the first plurality of queues to a tail of the first plurality of queues.

6. The method of claim 1, further comprising:
dropping an entire second queue of the first plurality of queues to perform rate adaptation after dequeuing of the first plurality of queues falls behind by a threshold amount of time, as determined based on a difference between a current time and the first scheduled time of the second queue exceeding the threshold amount.

7. The method of claim 1, further comprising:
applying a first aggregate rate shaper to control jitter of packets transmitted to the first device, after enqueuing the first packet and prior to transmitting the first packet to the first device.

8. The method of claim 1, further comprising:
determining, by the gateway device, a first drop probability for the first plurality of queues, the first drop probability indicating a likelihood that a packet of the first CoS will be dropped prior to transmission over the network;
determining, by the gateway device, a second drop probability for the second plurality of queues, the second drop probability indicating a likelihood that a packet of the second CoS will be dropped prior to transmission over the network;
determining, by the gateway device, a first random number for the first packet;
determining, by the gateway device, that the first random number is not less than the first drop probability;
receiving a second packet at the gateway device, directed to the first device;
determining, by the gateway device, that the second packet is associated with the second CoS;
determining, by the gateway device, a second random number for the second packet;
determining, by the gateway device, that the second random number is less than the second drop probability; and
dropping the second packet.

9. A computing device comprising:
a processor;
a network interface; and
a memory including instruction operable to be executed by the processor to perform a set of actions to configure the processor to:
configure a first plurality of queues in the memory to each have a first scheduled time, where the first plurality of queues is associated with a first class of service (CoS), the first scheduled time of each of queue of the first plurality of queues is different, and packets to be stored in each respective queue of the first plurality of queues will become available for dequeuing in accordance with the first scheduled time of the respective queue;
configure a second plurality of queues in the memory to each have a second scheduled time, where the second plurality of queues is associated with a second CoS, the second scheduled time of each of queue of the second plurality of queues is different, and packets to be stored in each respective queue of the second plurality of queues will become available for dequeuing in accordance with the second scheduled time of the respective queue;
receive a first packet directed to a first recipient device;
determine that the first packet is associated with the first CoS;
determine that the first packet is to be enqueued in the first plurality of queues based on the first CoS;
determine a first rate shaper and a second rate shaper of a plurality of rate shapers to apply to the first packet;

compute a first future time for transmission of the first packet via the network interface to produce a first flow rate of the first rate shaper;

compute a second future time for transmission of the first packet via the network interface to produce a second flow rate of the second rate shaper;

determine that the first future time is later than the second future time;

select a first queue of the first plurality of queues into which to enqueue the first packet based on the first queue having a first scheduled time that is closest to the first future time while being equal-to-or-sooner than the first future time;

enqueue the first packet into the first queue;

dequeue packets from the first plurality of queues and from the second plurality of queues for transmission over the network, where the first packet is dequeued from the first queue at or after the first schedule time of the first queue;

transmit the first packet to the first device via the network after the first packet is dequeued;

configure a third plurality of queues to each have a third scheduled time, where the third plurality of queues is associated with the first CoS, the third scheduled time of each of queue of the third plurality of queues is different, and packets stored in each respective queue of the third plurality of queues become available for dequeuing at the third scheduled time of the respective queue;

configure a fourth plurality of queues to each have a fourth scheduled time, where the fourth plurality of queues is associated with the second CoS, the fourth scheduled time of each of queue of the fourth plurality of queues is different, and packets stored in each respective queue of the fourth plurality of queues become available for dequeuing at the fourth scheduled time of the respective queue;

impose a first aggregate rate to packets dequeued from the first plurality of queues and the second plurality of queues prior to transmitting those packets over the network to a first plurality of devices;

impose a second aggregate rate to packets dequeued from the third plurality of queues and the fourth plurality of queues prior to transmitting those packets over the network to a second plurality of devices; and determine whether the first device is of the first plurality of devices or of the second plurality of devices, wherein the enqueuing of the first packet to the first queue of the first plurality of queues is further based on the first device being of the first plurality of devices.

10. The computing device of claim 9, wherein the instructions to dequeuer packets from the first plurality of queues and the second plurality of queues for transmission via the network interface further comprise instructions to:

determine an amount of available data units at a start of a current time interval of periodic time intervals;

determine whether there are any absolute priority queues with packets available for dequeuing;

determine a quantity of available data units to allocate to each of the absolute priority queues with packets available for dequeuing in descending priority order, wherein for each respective absolute priority queue, a number of packets to be dequeued from the respective absolute priority queue is a lesser of the amount of available data units divided by an average size of packets transmitted via the network interface, and a number of packets currently available for dequeuing in the respective absolute priority queue;

allocate the quantity of available data units to each of the absolute priority queues, decrementing the amount of available data units after each allocation; and after allocation of available data units to the absolute priority queues:

calculate a quantity of transmittable packets based on the amount of available data units divided by the average size of packets transmitted via the network interface;

identify whether there are any weighted priority queues with packets available for dequeuing;

determine a demand for the transmittable packets for each of the weighted priority queues with packets available for dequeuing, wherein for each respective weighted priority queue, the demand is a lesser of the quantity of transmittable packets and a number of packets currently available for dequeuing in the respective weighted priority queue;

calculate a sum of the demands of all of the weighted priority queues with packets available for dequeuing;

determine that the sum of demands exceeds the quantity of transmittable packets;

determine an order of rotation through the weighted priority queues with packets available for dequeuing, the order of rotation changing each periodic time interval;

rotate through the weighted priority queues in accordance with the order of rotation to determine which queues are overweight and which queues are underweight, wherein for each respective weighted priority queue, based on a weight assigned to the respective weighted priority queue and the data units already transmitted via the network interface during the current time interval, the respective weighted priority queue is determined to be underweight when packets already dequeued from it and any other queues of a same CoS during the current time interval used less than that CoS' total proportion of data units, and is determined to be overweight when the packets already dequeued from it and any other queues of a same CoS during the current time interval used more than that CoS' total proportion of data units;

allocate, in accordance with the order of rotation, a portion of the available data units to each underweight queue based on the weight assigned to the respective weighted priority queue, decrementing the amount of available data units after each allocation; and allocate a remainder of the available data units, after the allocation to the underweight queues, to the overweight queues in proportion to the weight assigned to each overweight queue, wherein the first queue, when the first packet is dequeued, is of the overweight queues.

11. The computing device of claim 9, wherein:

the processor comprises a first processing core and a second processing core, the instructions to enqueue the first packet configure the first processing core, and the instructions to dequeued packets configure the second processing core.

12. The computing device of claim 9, wherein the instructions further configure the processor to:

determine a time difference between a current time and the first scheduled time of a second queue of the first plurality of queues, prior to dequeuing the second queue;

compare the time difference with a threshold amount of time; and drop an entirety of packets in the second queue in response to the time difference exceeding the threshold amount of time.

13. The computing device of claim 9, wherein the instructions further configure the processor to:

determine a first drop probability for the first plurality of queues, the first drop probability indicating a likelihood that a packet of the first CoS will be dropped prior to transmission via the network interface;

determine a second drop probability for the second plurality of queues, the second drop probability indicating a likelihood that a packet of the second CoS will be dropped prior to transmission via the network interface;

determine a first random number for the first packet;

determine that the first random number is not less than the first drop probability;

receive a second packet directed to the first recipient device;

determine that the second packet is associated with the second CoS;

determine a second random number for the second packet;

determine that the second random number is less than the second drop probability; and drop the second packet in response to the second random number being less than the second drop probability.

14. The computing device of claim 9, wherein the instructions further configure the processor to:

assign a new first scheduled time to the first queue after all packets of the first queue are dequeued from the first queue, moving the first queue from a head of the first plurality of queues to a tail of the first plurality of queues.

15. A non-transitory computer-readable storage medium storing processor-executable instructions for controlling a processor of a computing device, comprising program code to configure the processor to:

configure a first plurality of queues in a memory to each have a first scheduled time, where the first plurality of queues is associated with a first class of service (CoS), the first scheduled time of each of queue of the first plurality of queues is different, and packets to be stored in each respective queue of the first plurality of queues will become available for dequeuing in accordance with the first scheduled time of the respective queue;

configure a second plurality of queues in the memory to each have a second scheduled time, where the second plurality of queues is associated with a second CoS, the second scheduled time of each of queue of the second plurality of queues is different, and packets to be stored in each respective queue of the second plurality of queues will become available for dequeuing in accordance with the second scheduled time of the respective queue;

receive a first packet directed to a first recipient device;

determine that the first packet is associated with the first CoS;

determine that the first packet is to be enqueued in the first plurality of queues based on the first CoS;

determine a first rate shaper and a second rate shaper of a plurality of rate shapers to apply to the first packet;

compute a first future time for transmission of the first packet via a network interface to produce a first flow rate of the first rate shaper;

compute a second future time for transmission of the first packet via the network interface to produce a second flow rate of the second rate shaper;

determine that the first future time is later than the second future time;

select a first queue of the first plurality of queues into which to enqueue the first packet based on the first queue having a first scheduled time that is closest to the first future time while being equal-to-or-sooner than the first future time;

enqueue the first packet into the first queue dequeue packets from the first plurality of queues and from the second plurality of queues for transmission over the network, where the first packet is dequeued from the first queue at or after the first schedule time of the first queue;

transmit the first packet to the first device via the network after the first packet is dequeued;

configure a third plurality of queues to each have a third scheduled time, where the third plurality of queues is associated with the first CoS, the third scheduled time of each of queue of the third plurality of queues is different, and packets stored in each respective queue of the third plurality of queues become available for dequeuing at the third scheduled time of the respective queue;

configure a fourth plurality of queues to each have a fourth scheduled time, where the fourth plurality of queues is associated with the second CoS, the fourth scheduled time of each of queue of the fourth plurality of queues is different, and packets stored in each respective queue of the fourth plurality of queues become available for dequeuing at the fourth scheduled time of the respective queue;

impose a first aggregate rate to packets dequeued from the first plurality of queues and the second plurality of queues prior to transmitting those packets over the network to a first plurality of devices;

impose a second aggregate rate to packets dequeued from the third plurality of queues and the fourth plurality of queues prior to transmitting those packets over the network to a second plurality of devices; and determine whether the first device is of the first plurality of devices or of the second plurality of devices, wherein the enqueuing of the first packet to the first queue of the first plurality of queues is further based on the first device being of the first plurality of devices.

16. The non-transitory computer-readable storage medium of claim 15, wherein the program code further configures the processor to:

determine a time difference between a current time and the first scheduled time of a second queue of the first plurality of queues, prior to dequeuing the second queue;

compare the time difference with a threshold amount of time; and drop an entirety of packets in the second queue in response to the time difference exceeding the threshold amount of time.

17. The non-transitory computer-readable storage medium of claim 15, wherein the program code further configures the processor to:

determine a first drop probability for the first plurality of queues, the first drop probability indicating a likelihood that a packet of the first CoS will be dropped prior to transmission via the network interface;
determine a second drop probability for the second plurality of queues, the second drop probability indicating a likelihood that a packet of the second CoS will be dropped prior to transmission via the network interface;
determine a first random number for the first packet;
determine that the first random number is not less than the first drop probability;
receive a second packet directed to the first recipient device;
determine that the second packet is associated with the second CoS;
determine a second random number for the second packet;
determine that the second random number is less than the second drop probability; and
drop the second packet in response to the second random number being less than the second drop probability.

* * * * *